(12) United States Patent
Koh

(10) Patent No.: US 11,758,092 B2
(45) Date of Patent: Sep. 12, 2023

(54) DISPLAY CONTROL DEVICE, DISPLAY CONTROL METHOD, AND DISPLAY CONTROL PROGRAM

(71) Applicant: PIONEER CORPORATION, Tokyo (JP)

(72) Inventor: Yoshihiro Koh, Tokyo (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 17/418,706

(22) PCT Filed: Dec. 20, 2019

(86) PCT No.: PCT/JP2019/050094
§ 371 (c)(1),
(2) Date: Jun. 25, 2021

(87) PCT Pub. No.: WO2020/137883
PCT Pub. Date: Jul. 2, 2020

(65) Prior Publication Data
US 2022/0086397 A1    Mar. 17, 2022

(30) Foreign Application Priority Data

Dec. 26, 2018  (JP) .................. 2018-243420

(51) Int. Cl.
*B60K 35/00*    (2006.01)
*H04N 7/18*     (2006.01)

(52) U.S. Cl.
CPC ............ *H04N 7/18* (2013.01); *B60K 35/00* (2013.01); *B60K 2370/176* (2019.05);
(Continued)

(58) Field of Classification Search
CPC .... H04N 7/18; B60K 35/00; B60K 2370/186; B60K 2370/176; B60K 2370/52; B60K 2370/794; B60K 2370/785
See application file for complete search history.

(56) References Cited

U.S. PATENT DOCUMENTS

2008/0129539 A1    6/2008  Kumon
2008/0309795 A1*  12/2008  Mitsuhashi ............ H04N 5/775
                                                            348/E5.022
(Continued)

FOREIGN PATENT DOCUMENTS

EP    1024666 A2    8/2000
JP    2007288282 A  11/2007
(Continued)

OTHER PUBLICATIONS

English machine translation of WO-2018003193-A1. (Year: 2018).*
English machine translation of JP-2014032033-A. (Year: 2014).*

*Primary Examiner* — Stephen G Sherman
(74) *Attorney, Agent, or Firm* — Procopio, Cory, Hargreaves & Savitch LLP

(57) ABSTRACT

To provide a display control device that enables a passenger to understand when an image shot of the outside of the moving body and reproduced in the moving body was shot. When displaying images shot of the outside of a moving body in the moving body, the display control device, while updating with a lapse of time, how far back in a past from now the image being displayed was shot.

11 Claims, 20 Drawing Sheets

(52) U.S. Cl.
CPC .... *B60K 2370/186* (2019.05); *B60K 2370/52* (2019.05); *B60K 2370/785* (2019.05); *B60K 2370/794* (2019.05)

(56) References Cited

U.S. PATENT DOCUMENTS

| | | | |
|---|---|---|---|
| 2009/0088968 A1 | 4/2009 | Tsutsui | |
| 2009/0237743 A1* | 9/2009 | Hasegawa | H04N 1/3875 358/448 |
| 2015/0321607 A1* | 11/2015 | Cho | B60R 1/00 348/148 |
| 2019/0149774 A1 | 5/2019 | Watanabe | |

FOREIGN PATENT DOCUMENTS

| | | | | |
|---|---|---|---|---|
| JP | 2009093076 A | | 4/2009 | |
| JP | 2014032033 A | * | 2/2014 | |
| JP | 2016/027682 A | | 2/2016 | |
| JP | 2018006921 A | | 1/2018 | |
| JP | 2018038009 A | | 3/2018 | |
| WO | WO-2018003193 A1 | * | 1/2018 | ............... B60R 1/00 |

\* cited by examiner current time : 10:15:44
shooting time : 10:15:32 current time : 10:15:45
shooting time : 10:15:33 current time : 10:15:46
shooting time : 10:15:34

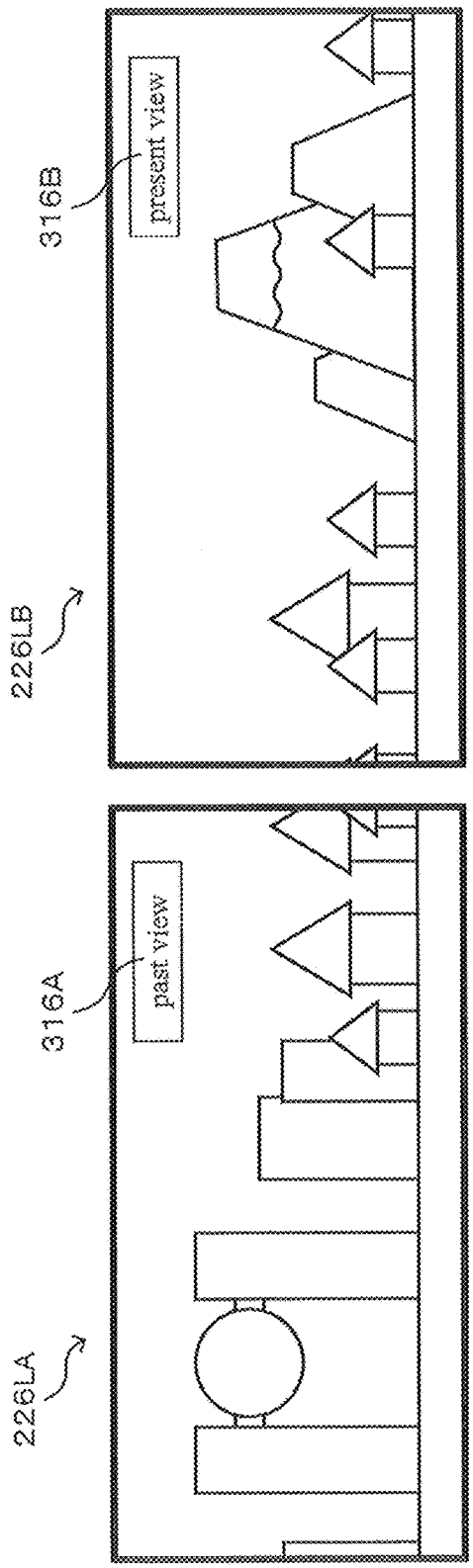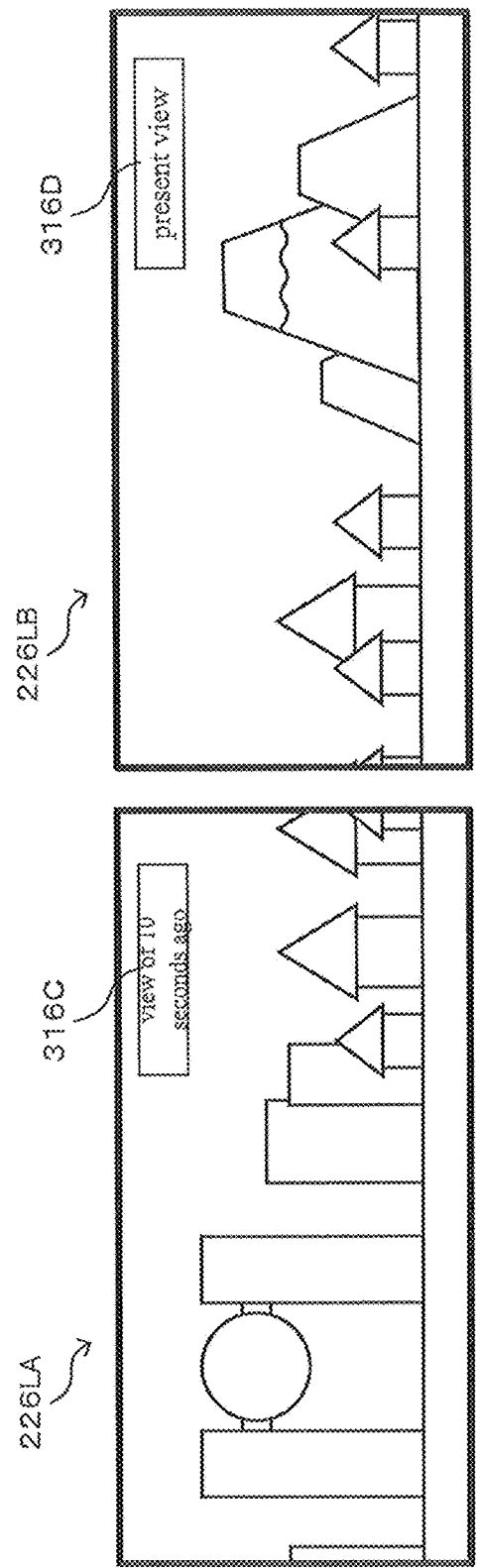
FIG. 15 (A)
FIG. 15 (B)

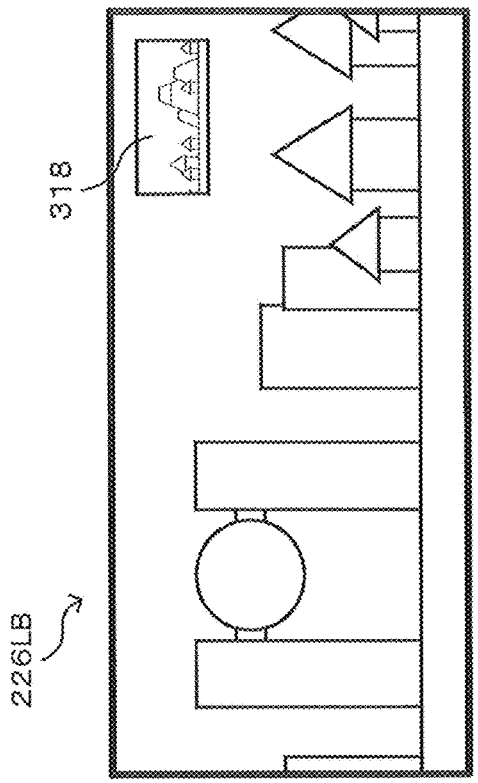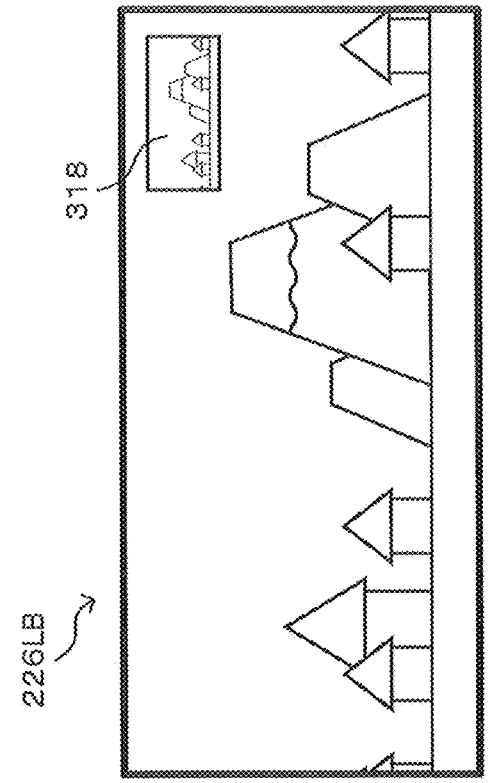
FIG. 17 (A)
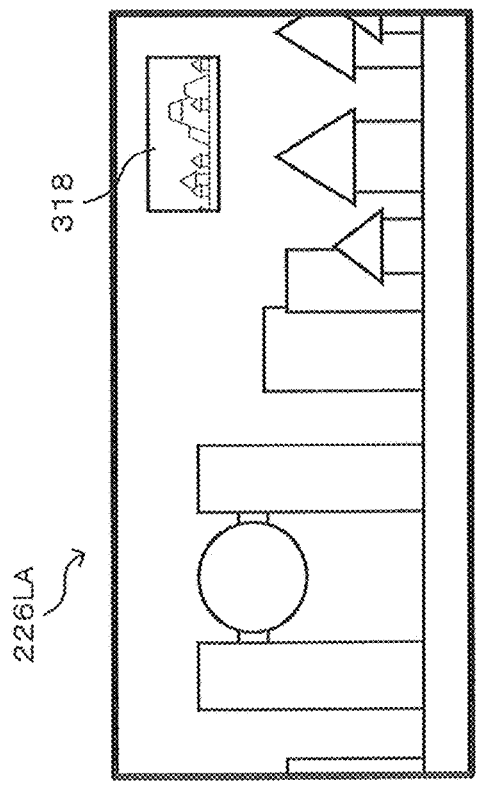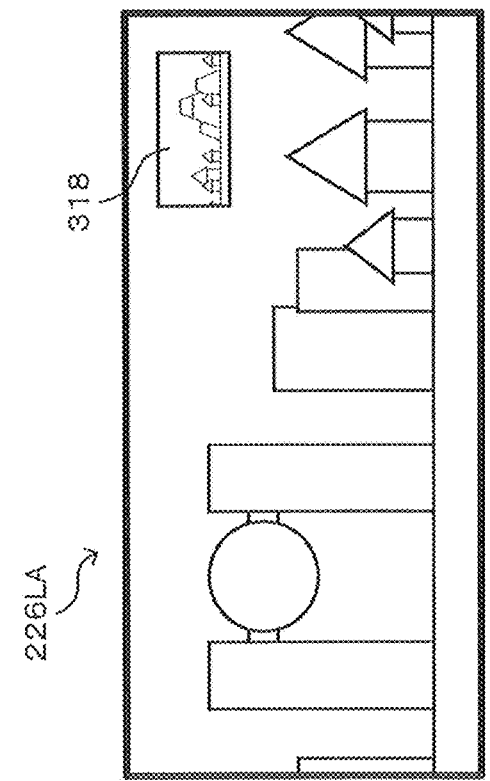
FIG. 17 (B)

DISPLAY CONTROL DEVICE, DISPLAY CONTROL METHOD, AND DISPLAY CONTROL PROGRAM

CROSS-REFERENCE TO RELATED APPLICATIONS

This application is a U.S. National Stage entry of PCT Application No: PCT/JP2019/050094 filed Dec. 20, 2019, which claims priority to Japanese Patent Application No. 2018-243420 filed Dec. 26, 2018, the contents of which are incorporated herein by reference.

TECHNICAL FIELD

The present application relates to the technical field of a display control device that displays an image obtained by shooting an outside of a moving body in the moving body.

BACKGROUND ART

Patent Literature 1 discloses a technology of shooting a moving image of an outside of a passenger vehicle and outputting a corresponding past moving image to a display device provided on a window portion of the passenger vehicle when a passenger specifies a time (10 seconds ago) or an object (a mountain, a bridge, a stores, and so on).

CITATION LIST

Patent Literature

Patent Literature 1: JP 2018-38009 A

SUMMARY OF INVENTION

Technical Problem

However, when a past moving image obtained by shooting the outside of the vehicle is displayed on the window portion, it is difficult for the passenger to grasp whether the view appearing on the window portion is a view at the current location or a view at a point through which the passenger passed in the past, and there is a risk of confusion.

Therefore, in view of one example of such a problem, it is an object of the present invention to provide a display control device and the like that enable a passenger to grasp whether an image obtained by shooting the outside of a moving body and displayed in the moving body is an image obtained by shooting a current outside or an image obtained by shooting a past outside.

Solution to Problem

An invention described in claim 1 is a display control device comprising a display control means that displays an image obtained by shooting an outside of a moving body in the moving body, wherein when displaying the image, the display control means displays, while updating with a lapse of time, how far back in a past from now the image being displayed was shot.

An exemplary aspect of the present invention is a display control method by a display control device, the display control method comprising: a display control step of displaying an image obtained by shooting an outside of a moving body in the moving body; and an update step of displaying, while updating with a lapse of time, how far back in past from now the image being displayed was shot, when displaying the image by the display control step.

An exemplary aspect of the present invention is a display control program that causes a computer included in a display control device to function as a display control means that displays an image obtained by shooting an outside of a moving body in the moving body, wherein when displaying the image, the display control means displays, while updating with a lapse of time, how far back in a past from now the image being displayed was shot.

FIGS. 6(A) to (C) are views showing a transition example of the display (lower left) 226LL in the first example.

FIGS. 7(A) to (D) are views showing a transition example of the display (lower left) 226LL in the first example.

Figure 8:
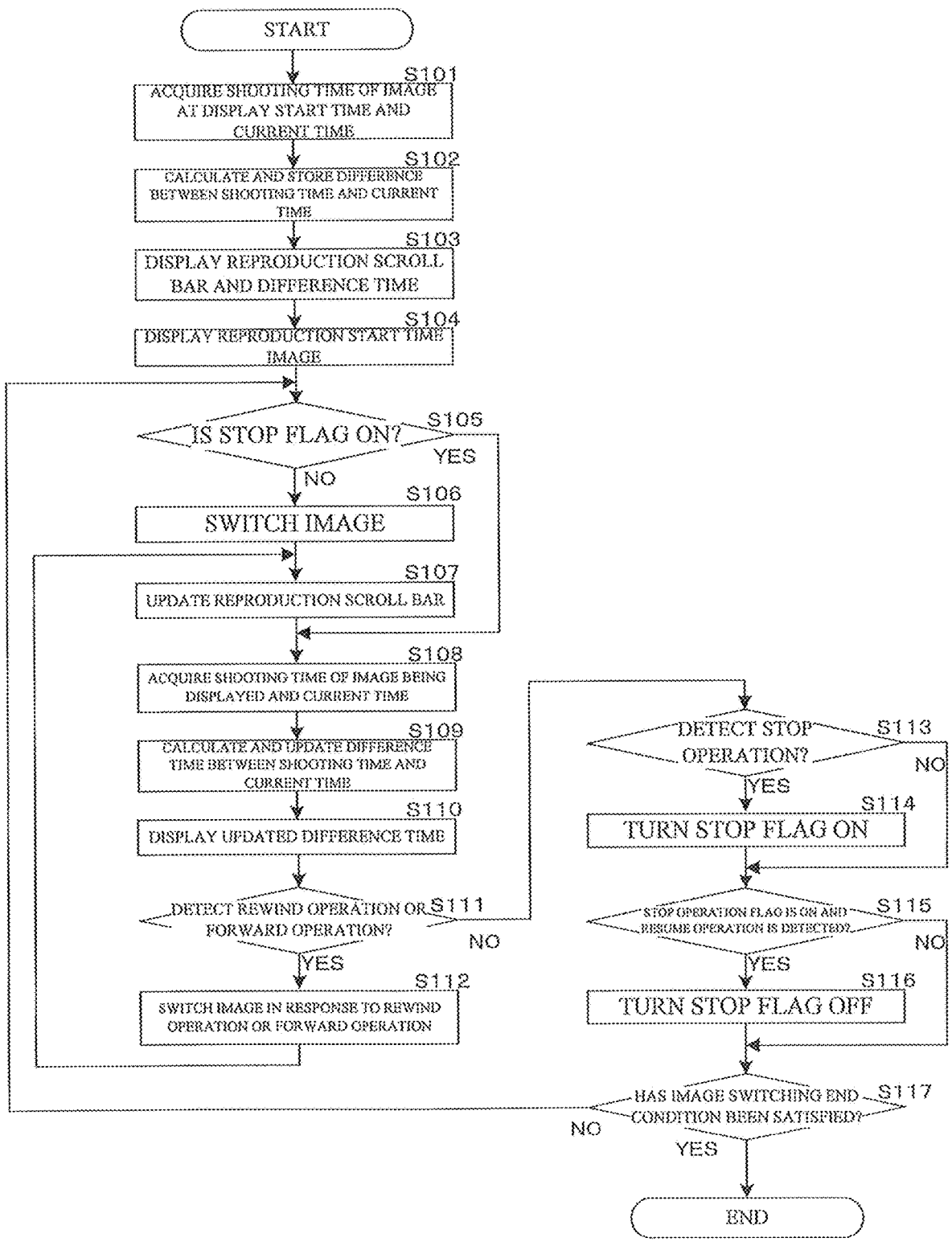

FIG. 8 is a flowchart showing an example of display control processing by a control unit 211 in the first example.

Figure 9:
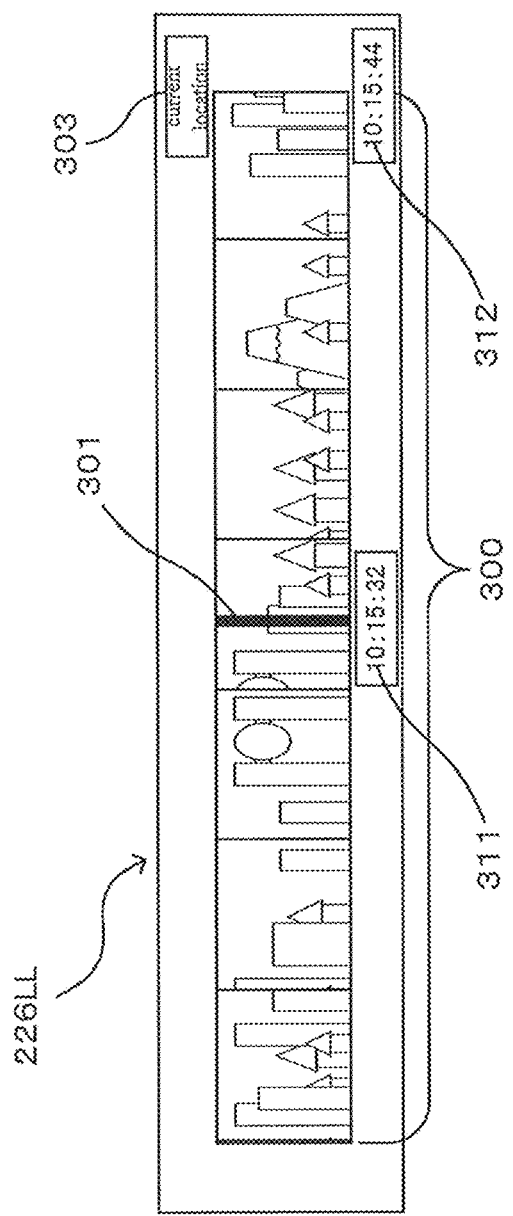

FIG. 9 is a view showing a display example of a display (lower left) 226LL in the second example.

FIGS. 10(A) to (C) are views showing a transition example of the display (lower left) 226LL in the second example.

FIGS. 11(A) to (D) are views showing a transition example of the display (lower left) 226LL in the second example.

Figure 12:
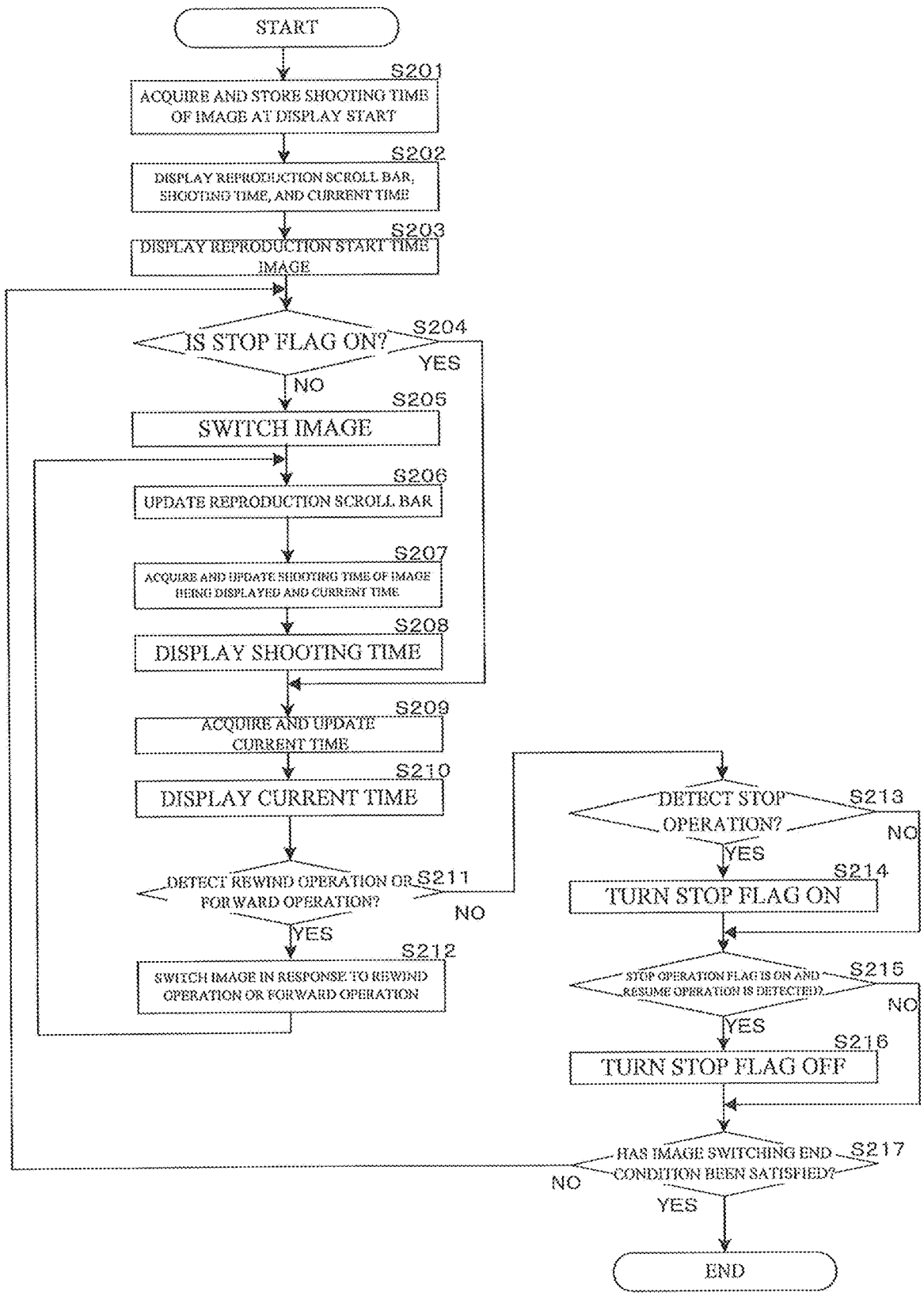

FIG. 12 is a flowchart showing an example of display the control processing by the control unit 211 in the second example.

Figure 13:
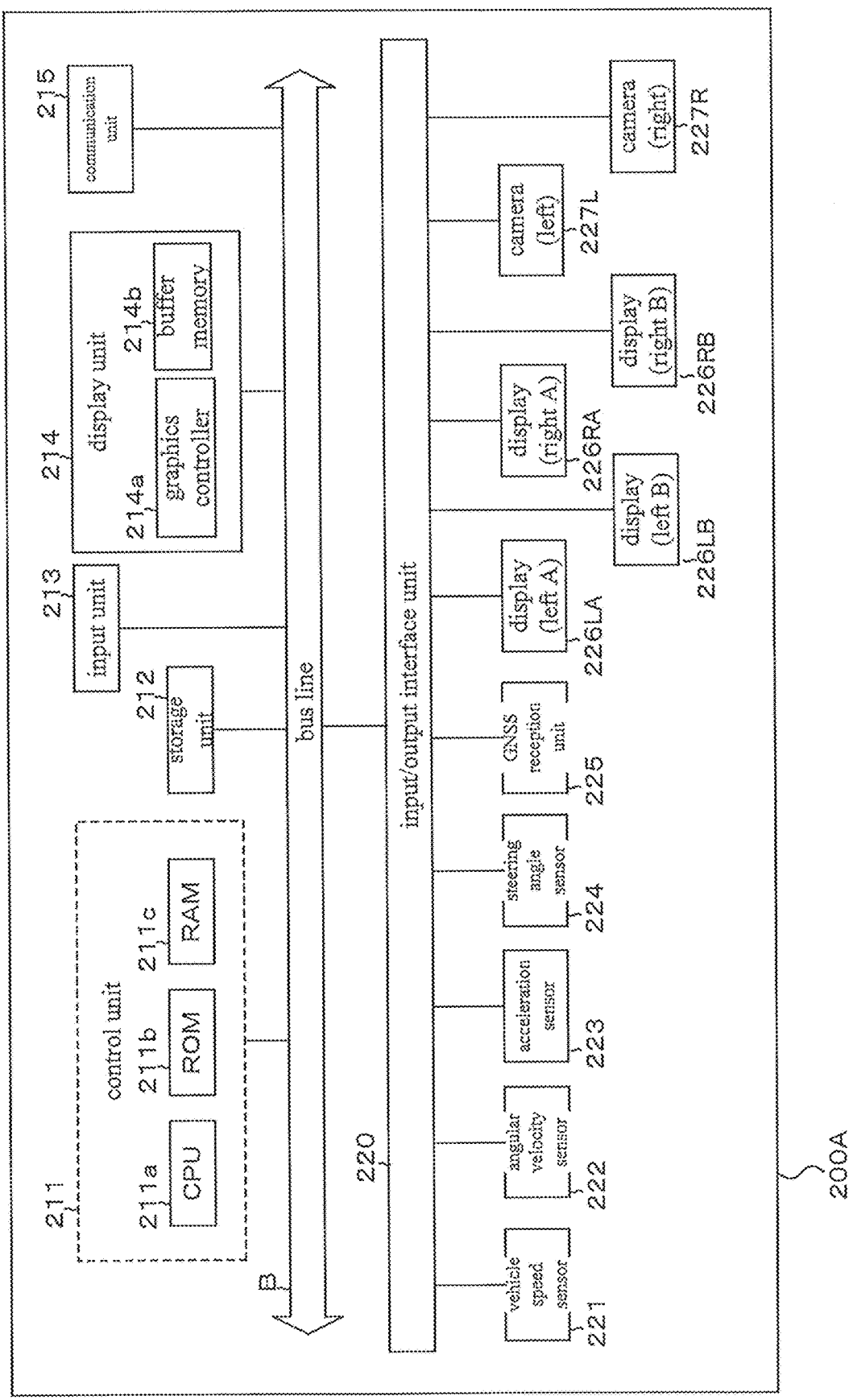

FIG. 13 is a block diagram showing a configuration example of a display control device 200A in a third example.

Figure 14:
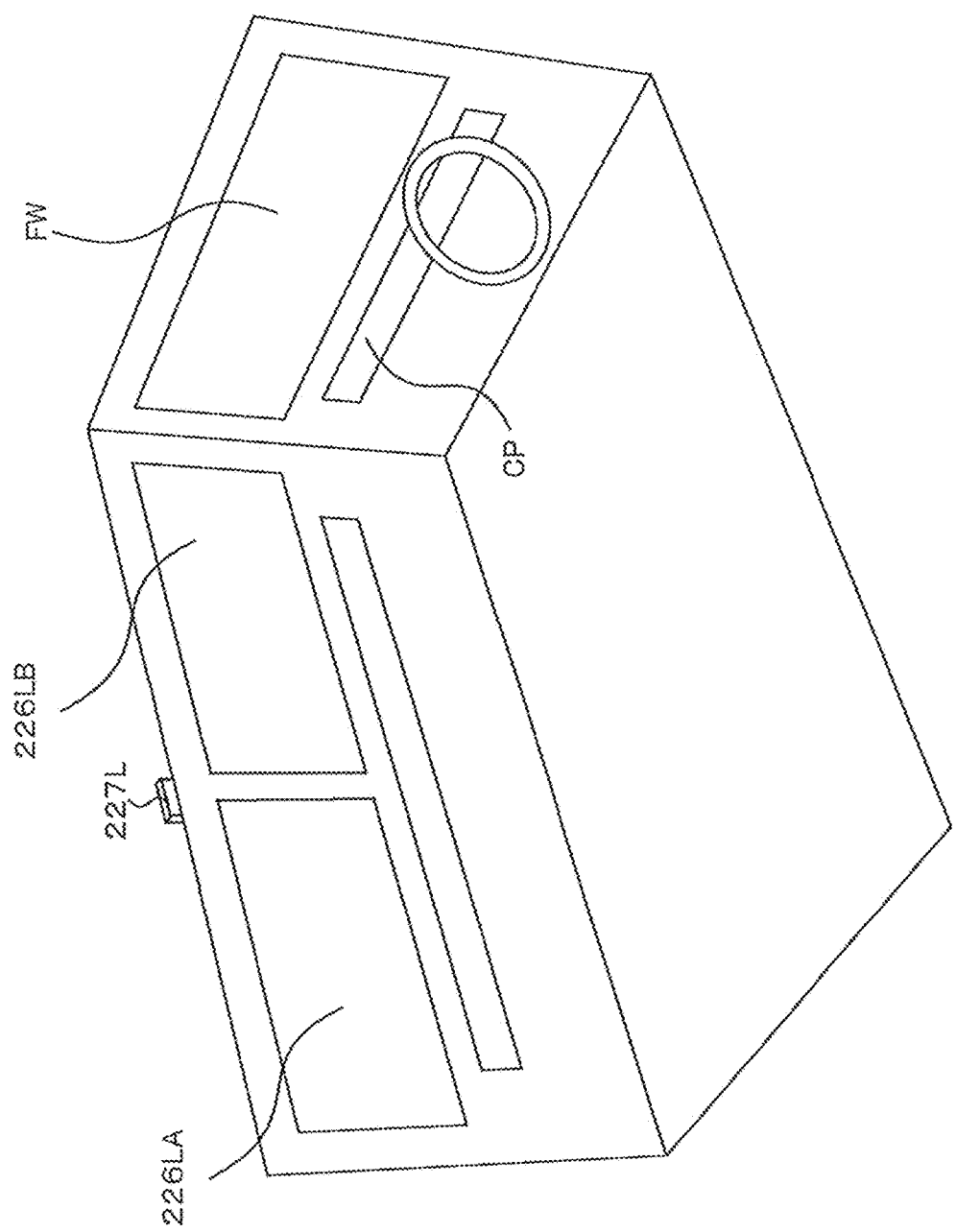

FIG. 14 is a schematic diagram showing an example of a vehicle (mainly inside thereof) equipped with the display control device 200A in the third example.

FIGS. 15(A) and (B) are views showing display examples of a display (left A) 226LA and a display (left B) 226LB in the third example.

Figure 16:
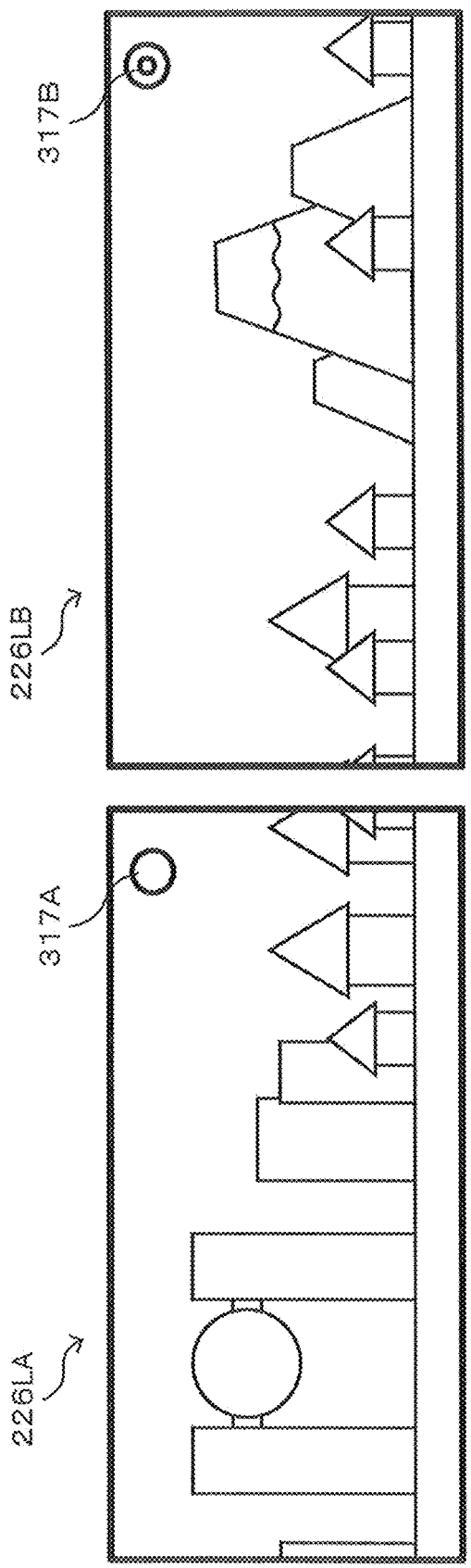

FIG. 16 is a view showing a display example of the display (left A) 226LA and the display (left B) 226LB in the third example.

FIGS. 17(A) and (B) are views showing display examples of the display (left A) 226LA and the display (left B) 226LB in the third example.

Figure 18:
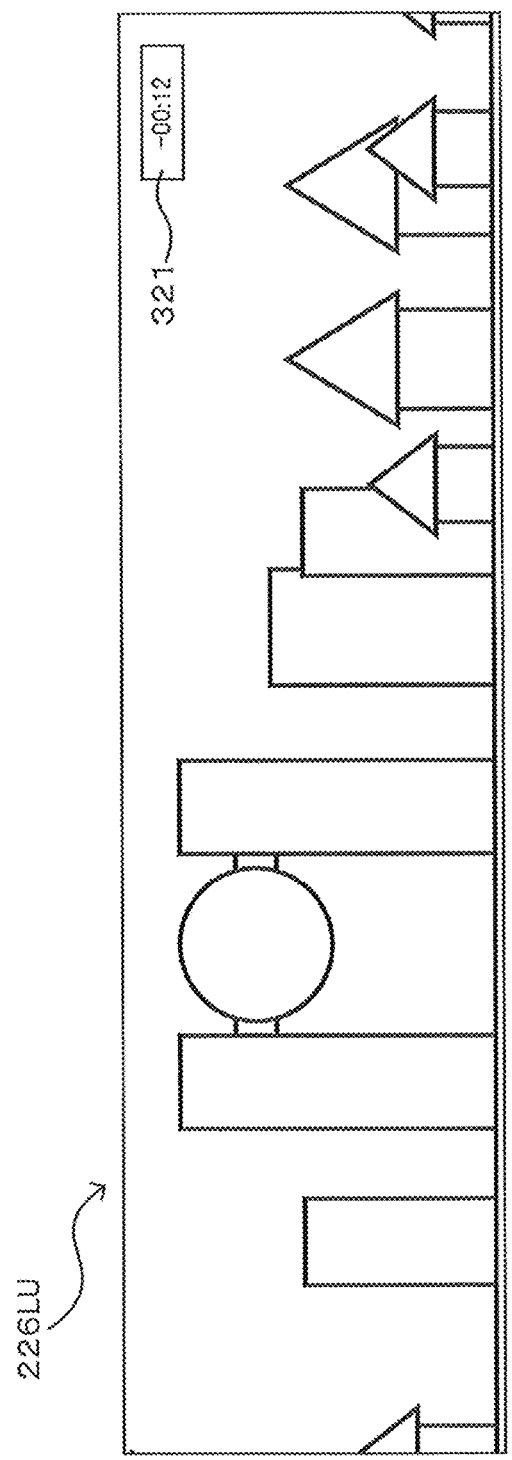

FIG. 18 is a view showing a display example of a display (upper left) 226LU in the variation 1.

Figure 19:
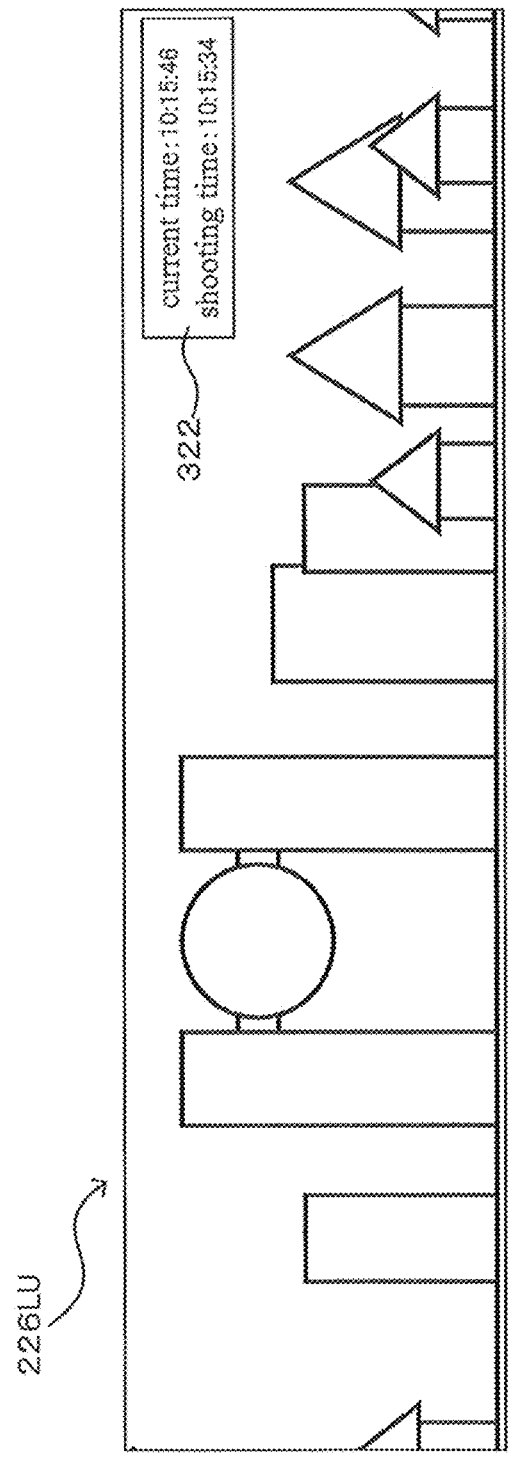

FIG. 19 is a view showing a display example of the display (upper left) 226LU in the variation 2.

Figure 20:
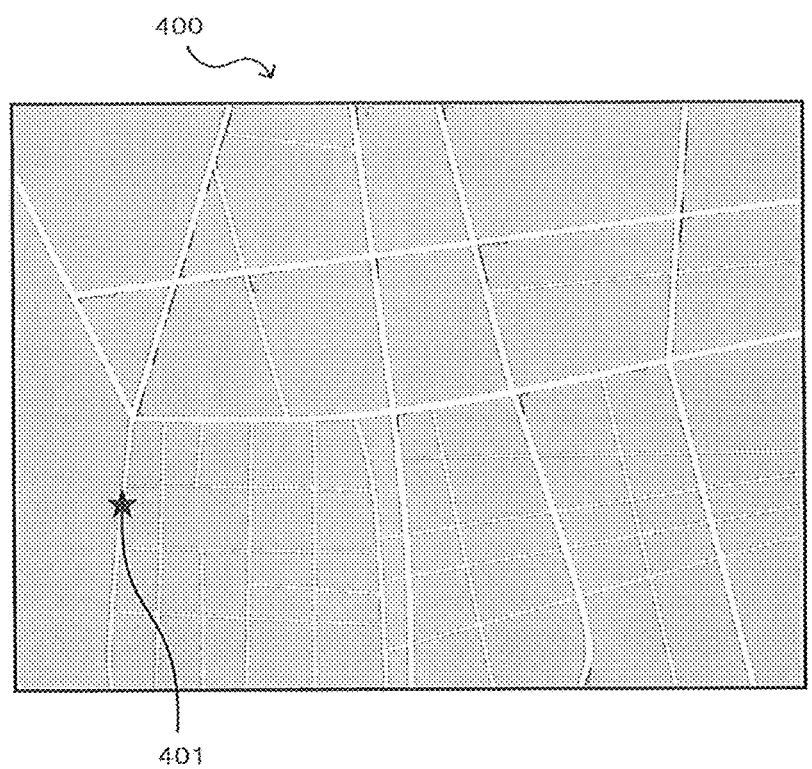

FIG. 20 is a view showing a display example of a map 400 in the variation 3.

Figure 21:
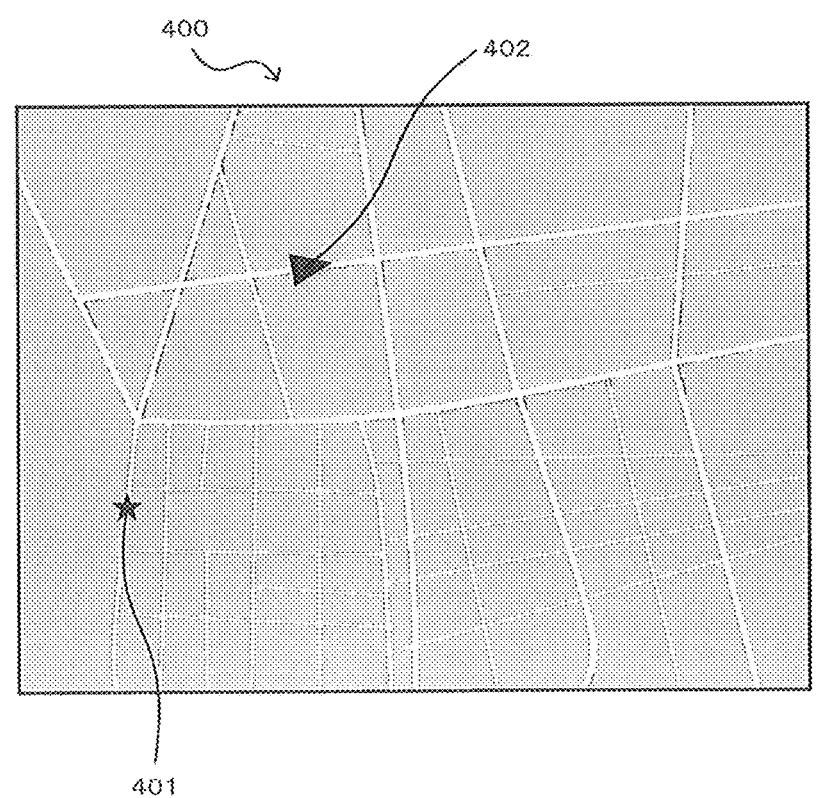

FIG. 21 is a view showing a display example of the map 400 in the variation 3.

MODES FOR CARRYING OUT THE INVENTION

An embodiment for carrying out the invention of the present application will be described with reference to FIG. 1.

Figure 1:
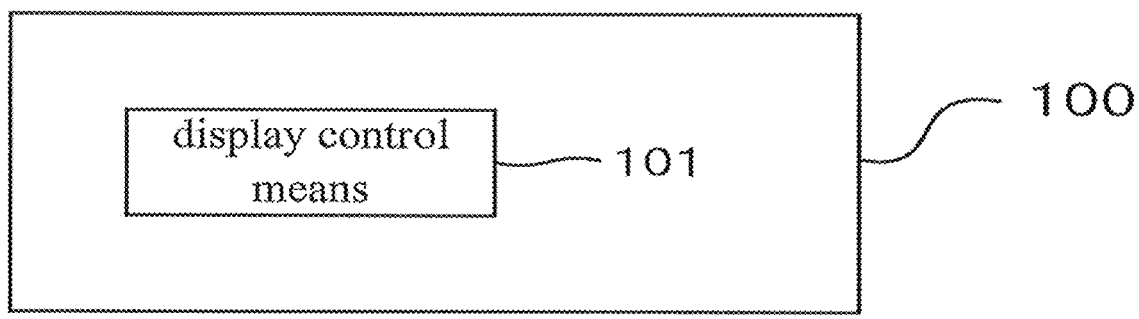
FIG. 1 is a block diagram showing a configuration example of a display control device 100 in an embodiment.

As shown in FIG. 1, the display control device 100 includes a display control means 101.

The display control means 101 displays an image obtained by shooting the outside of a moving body in the moving body.

Then, when displaying the image, the display control means 101 displays, while updating with the lapse of time, how far back in the past from now the image being displayed was shot.

According to the display control device 100, when an image captured by shooting the outside of the moving body is displayed in the moving body, how far back in the past from now the image being displayed was shot is displayed while being updated with the lapse of time. Therefore, it is possible for the passenger to grasp when an image obtained by shooting the outside of a moving body and displayed in the moving body was shot.

EXAMPLES

1. First Example

Next, the first example corresponding to the above-described embodiment will be described. Note that the first example described below is an example in a case where the invention of the present application is applied to the display control device 200 mounted on a vehicle. Hereinafter, the vehicle equipped with the display control device 200 is sometimes referred to as an own vehicle.

[1.1. Configuration of Display Control Device 200]

Figure 2:
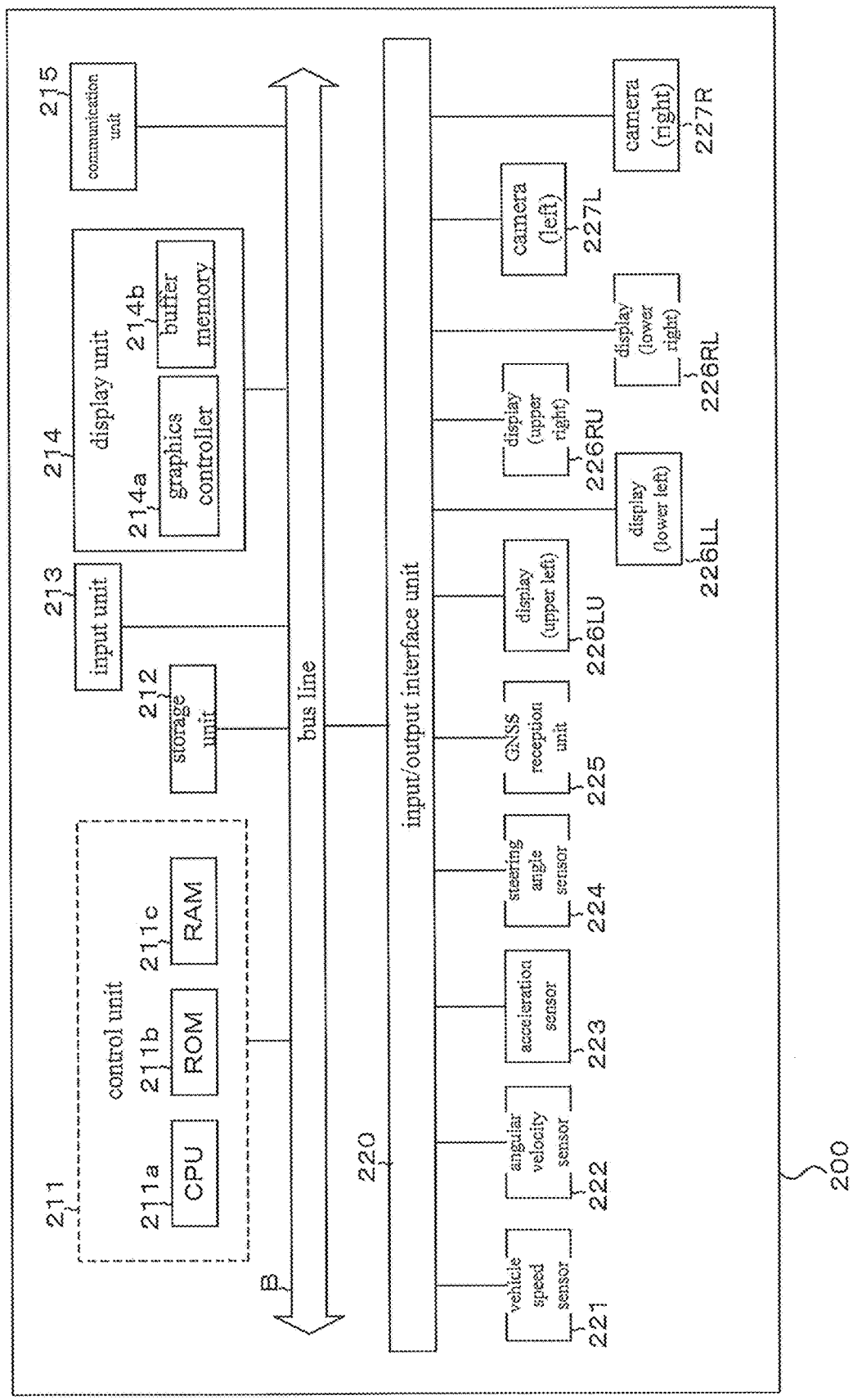
FIG. 2 is a block diagram showing a configuration example of a display control device 200 in a first example.
Figure 3:
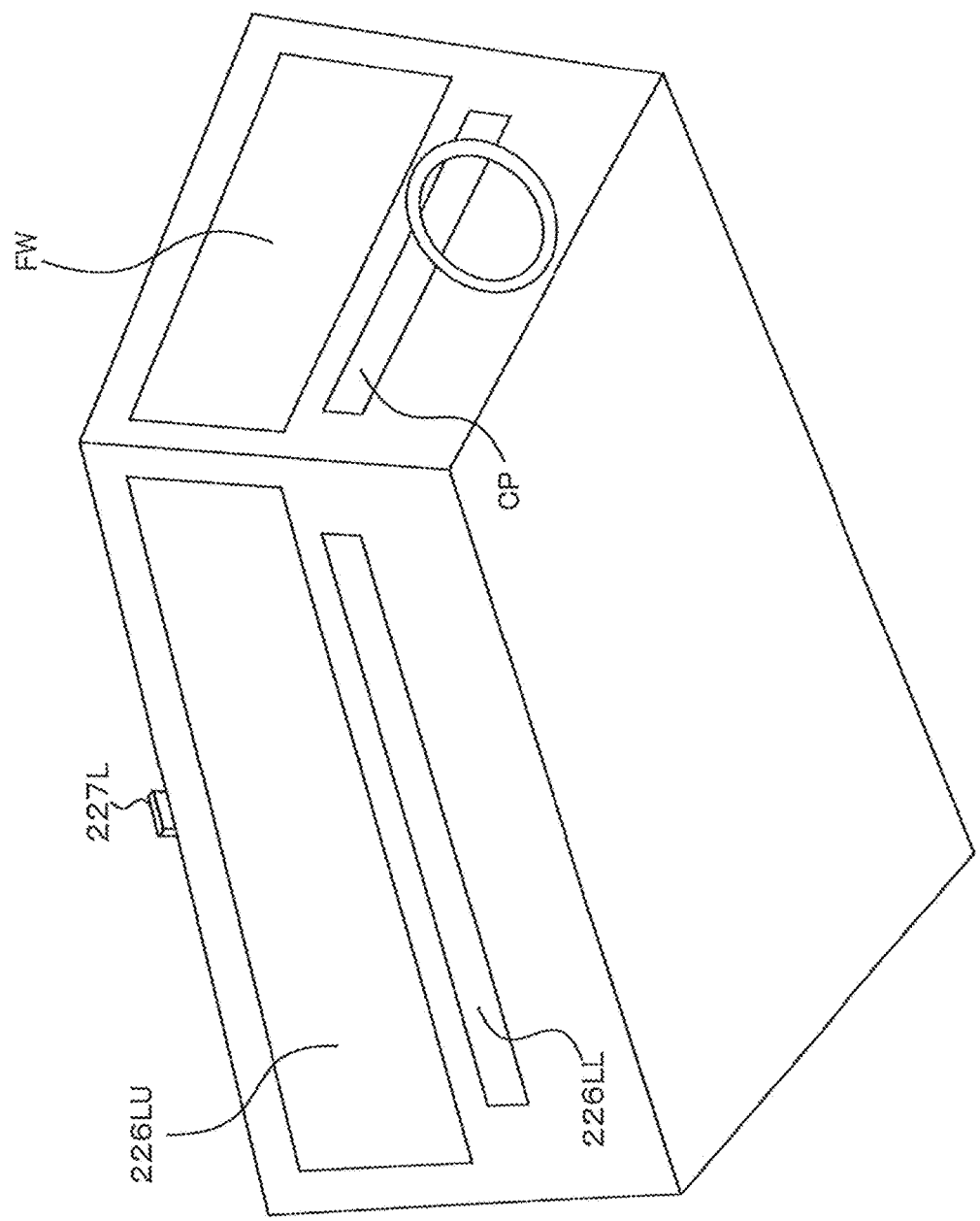
FIG. 3 is a schematic diagram showing an example of a vehicle (mainly inside thereof) equipped with the display control device 200 in the first example.
Figure 4:
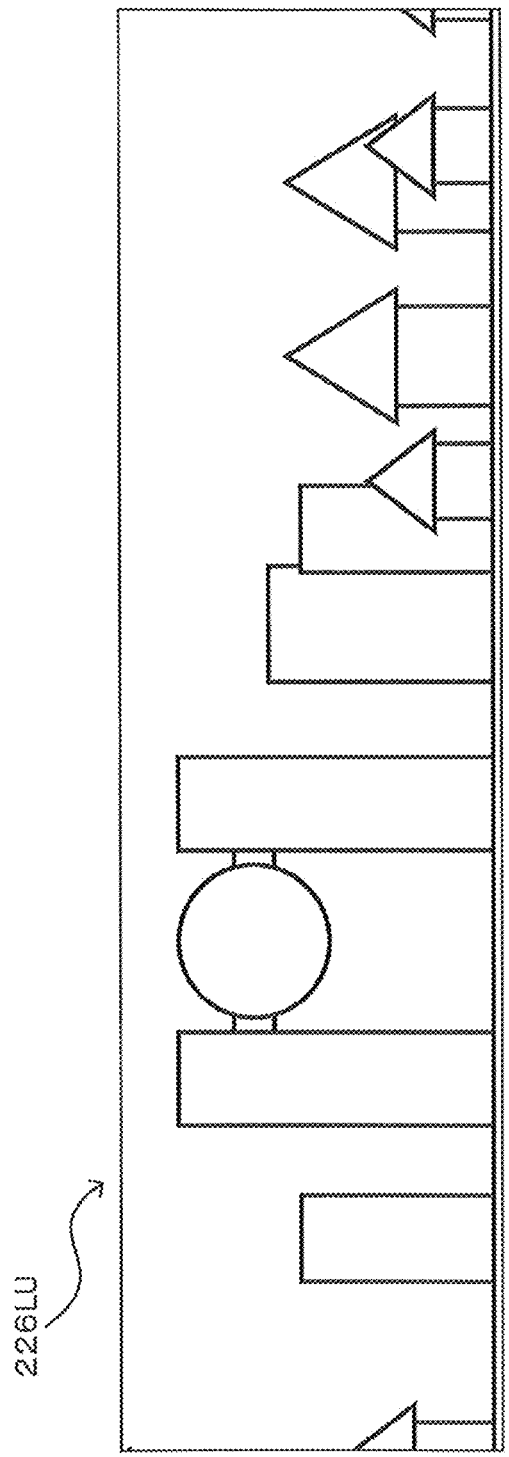
FIG. 4 is a view showing a display example of a display (upper left) 226LU in the first example.
Figure 5:
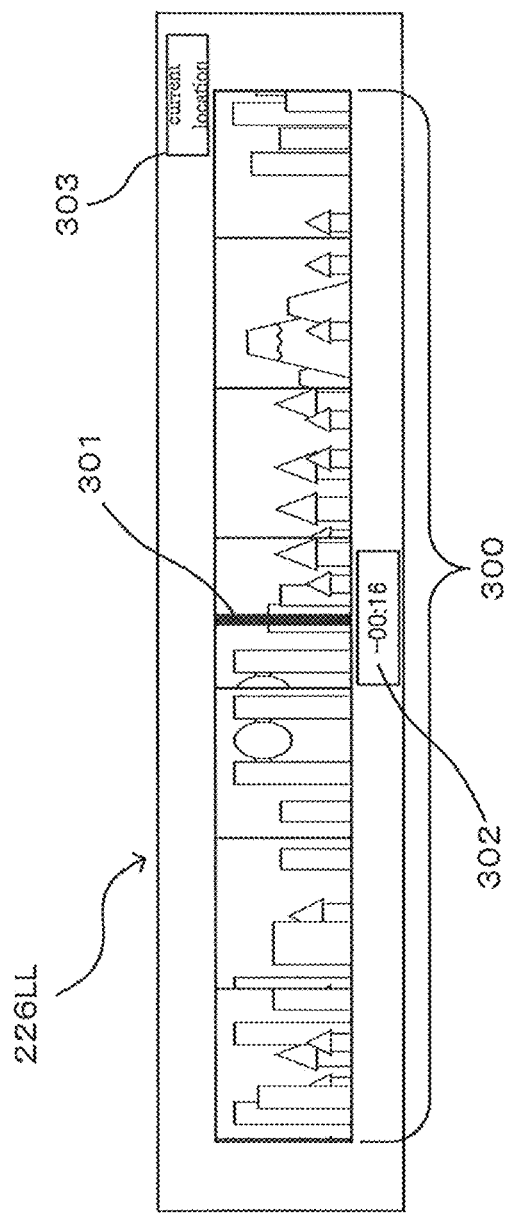
FIG. 5 is a view showing a display example of a display (lower left) 226LL in the first example.
Figure 6:
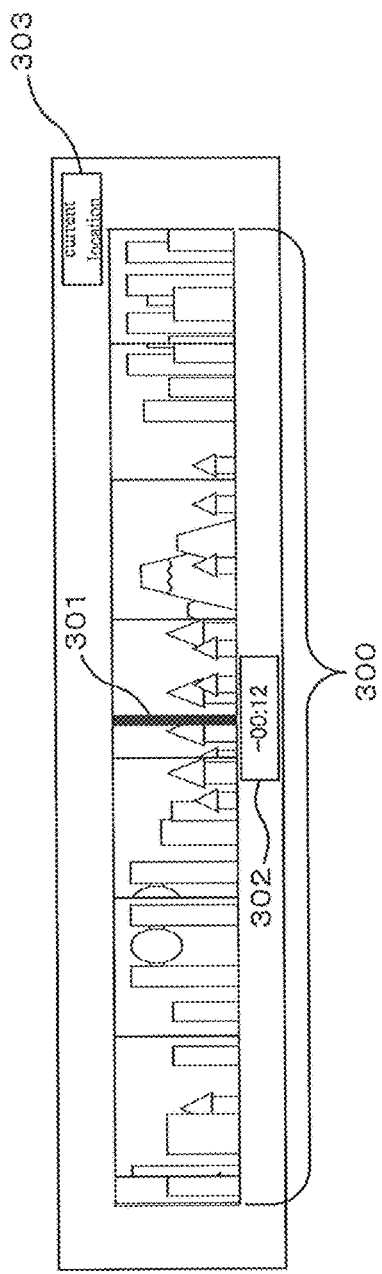
Figure 6:
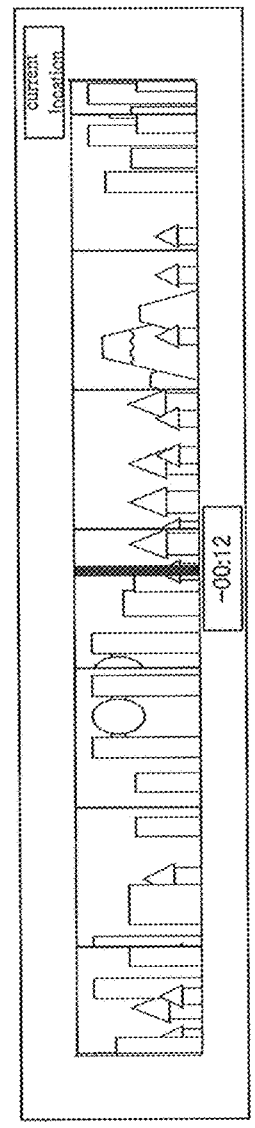
Figure 6:
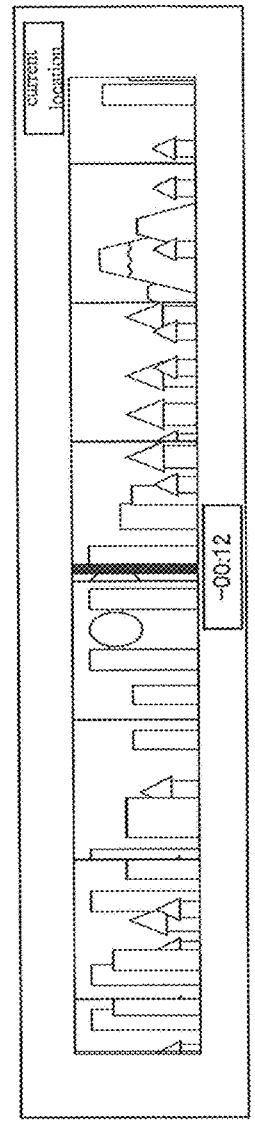
Figure 7:
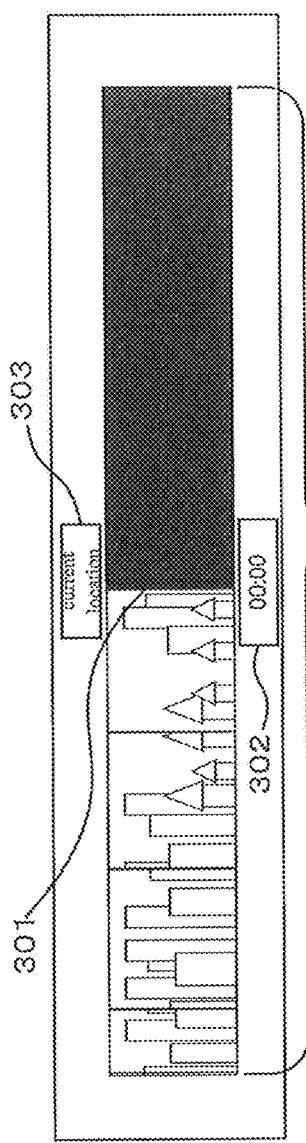
Figure 7:
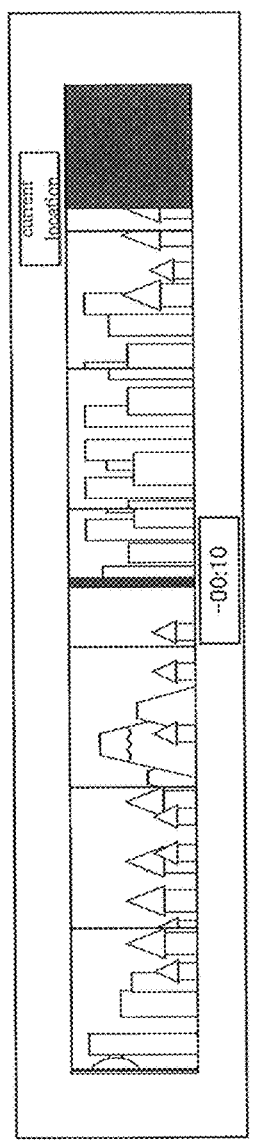
Figure 7:
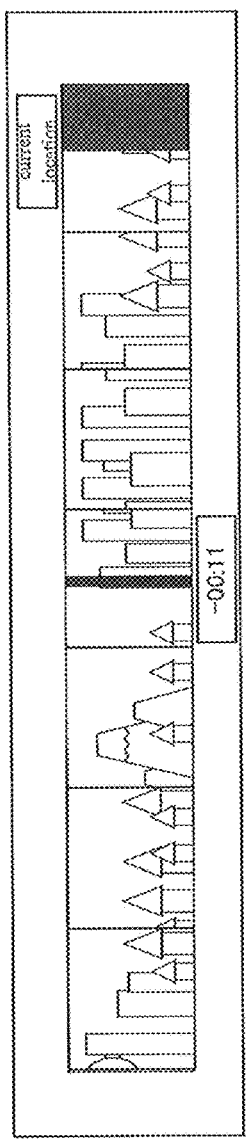
Figure 7:
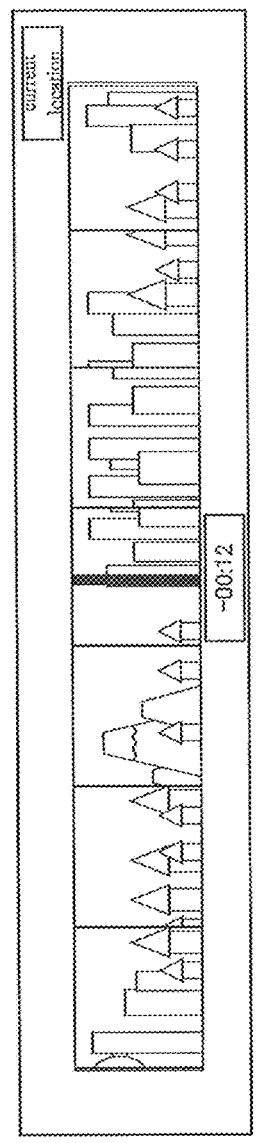

The configuration of the display control device 200 in the first example will be described with reference to FIGS. 2 to 7. FIG. 2 is a block diagram showing a configuration example of the display control device 200, and FIG. 3 is a schematic diagram showing an example of a vehicle (mainly inside thereof) equipped with the display control device 200. Note that in the vehicle shown in FIG. 3, the direction in which a windshield FW and a control panel CP are installed corresponds to a forward direction. FIG. 4 is a view showing a display example of the display (upper left) 226LU, and FIG. 5 is a view showing a display example of the display (lower left) 226LL. FIGS. 6 to 7 are views showing a transition example of the display (lower left) 226LL.

As shown in FIG. 2, the display control device 200 is configured to include a control unit 211, a storage unit 212 including a hard disk drive (HDD), a solid state drive (SSD) and the like, an input unit 213 including a keyboard and a touchscreen and the like, a display unit 214, a communication unit 215, a bus line B, an input/output interface unit 220, a vehicle speed sensor 221, an angular velocity sensor 222, an acceleration sensor 223, a steering angle sensor 224, a global navigation satellite system (GNSS) reception unit 225, the display (upper left) 226LU, the display (lower left) 226LL, a display (upper right) 226RU, a display (lower right) 226RL, a camera (left) 227L, and a camera (right) 227R. Note that the display (upper left) 226LU, the display (lower left) 226LL, the display (upper right) 226RU, and the display (lower right) 226RL are sometimes collectively referred to as a display 226. Furthermore, the camera (left) 227L and the camera (right) 227R are sometimes collectively referred to as a camera 227.

The control unit 211 includes a CPU 211a that controls the entire control unit 211, a ROM 211b in which a control program and the like that controls the control unit 211 are stored in advance, and a RAM 211c that temporarily stores various data. Then, the CPU 211a functions as various means by reading and executing various programs stored in the ROM 211b and the storage unit 212. The control unit 211 or the CPU 211a corresponds to a "computer".

The storage unit 212 stores various programs such as an operating system (OS) and an application program, and data and information used in the various programs. The OS manages a system clock and maintains accurate time by periodically connecting to and synchronizing with the time server. In addition, the storage unit 212 stores a display control program for displaying an image on the display 226. Note that the various programs may be acquired from, for example, a server device or the like via a network, or may be read from a recording medium such as a CD, a DVD, or a USB memory.

The storage unit 212 stores images of the outside of the own vehicle shot by each of the camera (left) 227L and the camera (right) 227R. Each image is stored so that the shooting time of the image can be specified. For example, the image itself may hold the shooting time as attribute information, or it the image and the shooting time may be managed by a table or the like that associates together. When an image is shot in a moving image format, the image is stored so that the shooting time can be specified for each of the plurality of continuous images constituting the moving image. Furthermore, the storage unit 212 stores an image obtained by reducing each image (hereinafter, sometimes referred to as a thumbnail image) in association with the image. The shooting time can be, for example, the shooting time at the time point when the storage unit 212 stores the image.

The input unit 213 receives an input operation by the operator and transmits, to the control unit 211, an operation signal indicating the operation content.

The display unit 214 includes a graphics controller 214a and a buffer memory 214b including a memory such as a video RAM (VRAM). In this configuration, the graphics controller 214a controls the display unit 214 and the display 226 based on the control information sent from the control unit 211 via the bus line B. In addition, the buffer memory 214b temporarily stores image data that can be immediately displayed on each display 226. Then, an image is displayed on each display 226 based on the image data output from the graphics controller 214a.

The display unit 214 performs processing of displaying an image on the display (upper left) 226LU and the display (upper right) 226RU under the control of the control unit 211. Furthermore, the display unit 214 performs processing of displaying the reproduction scroll bar and the like described later on the display (lower left) 226LL and the display (lower right) 226RL.

The vehicle speed sensor 221 detects the current speed of the own vehicle using, for example, a speed detection processing or the like using a vehicle speed pulse or the like acquired from the own vehicle equipped with the display control device 200, and outputs speed data. The angular velocity sensor 222 detects, for example, an angular velocity of a direction change of the own vehicle, and outputs angular velocity data and relative orientation data per unit time. The acceleration sensor 223 detects acceleration in, for example, the front-rear direction of the own vehicle, and outputs acceleration data per unit time or the like. The steering angle sensor 224 detects a steering angle of the own vehicle and outputs steering angle data and the like. The GNSS reception unit 225 receives navigation radio waves from a GNSS satellite and outputs GNSS positioning data.

The camera 227 generates an image by shooting the outside of the own vehicle. Specifically, the camera (left) 227L shoots a view on the left side as viewed from the own vehicle as shown in FIG. 3. In addition, the camera (right) 227R (not illustrated in FIG. 3) shoots a view on the right side as viewed from the own vehicle. The image generated by the camera 227 is stored in the storage unit 212. Note that the camera 227 performs shooting both when the own vehicle is stopped and when the own vehicle is in motion so that the passenger can enjoy the view from the own vehicle by the image displayed on the display 226. That is, the camera 227 generates a plurality of continuous images by performing continuous shooting or performing shooting in a moving image format.

The display 226 is installed inside the own vehicle in a side surface direction with reference to the movement direction of the own vehicle (the forward direction and the backward direction, which is an opposite direction of the forward direction), and displays an image generated by the camera 227. Specifically, as shown in FIG. 3, the display (upper left) 226LU is installed on a left side surface portion inside the own vehicle, and displays an image generated by the camera (left) 227L as shown in FIG. 4. Similarly, the display (upper right) 226RU (not illustrated in FIG. 3) is installed on a right side surface portion inside the own vehicle, and displays an image shot by the camera (right) 227R. Note that since the difference between the display (upper left) 226LU and the display (upper right) 226RU lies in whether to be installed on the left side or the right side of the vehicle, respectively, the display (upper left) 226LU installed on the left side will be explained below, and the explanation on the display (upper right) 226RU installed on the right side is sometimes omitted.

The control unit 211 performs an image reproduction control of displaying, on the display (upper left) 226LU, a plurality of continuous images generated by the camera (left) 227L while switching the images in order of shooting (shooting order). Note that for a plurality of continuous images shot in a moving image format, the control unit 211 performs a reproduction control of the images so that the shooting time and the reproduction time of the moving image match. Due to this, even if no window is installed on the left side surface portion and the right side surface portion of the own vehicle, the passenger can enjoy the view by the display 226 displaying the image shot by the camera 227. In addition, the passenger can also enjoy back the view shot in the past, i.e., the view from the point through which the own vehicle has passed. Furthermore, since a plurality of continuous images obtained by shooting with the lapse of time are displayed while being switched, it is possible to obtain realistic sensations as if the passenger actually sees the view through the window.

Furthermore, the display (upper left) 226LU can also display in real time an image shot by the camera (left) 227L. That is, when an operation (e.g., operation of repeating a forward operation described below to the limit) of displaying the latest image while displaying an image shot in the past by the camera (left) 227L or an operation (e.g., operation on a current location button 303 described later) for seeing the view outside the vehicle at the current location is detected, the control unit 211 displays, on the display (upper left) 226LU, the image shot by the camera (left) 227L at that time. This enables the passenger to see in real time, via the camera (left) 227L and the display (upper left) 226LU, the view seen from the own vehicle.

Note that the display (upper left) 226LU may be made transparent to show the view from the own vehicle to the passenger in real time. For example, a display having a structure capable of transparent/non-transparent switching control of the display is adopted as the display (upper left) 226LU. The control unit 211 controls the display to be in the non-transparent state and displays the image when displaying an image shot by the camera (left) 227L, and controls the display to be in the transparent state and allows the passenger to visually recognize through the transparent rear side of the display in a case where an operation for seeing the view outside the vehicle at the current location by the operator is detected. Due to this, by performing an operation for seeing the view outside the vehicle, the passenger can see not a view displayed as an image but a live view through the display.

On the other hand, the display (lower left) 226LL is installed below the display (upper left) 226LU on the left side surface portion inside the own vehicle as shown in FIG. 3, and displays a reproduction scroll bar 300 corresponding to the image displayed on the display (upper left) 226LU as shown in FIG. 5. In addition, the display (lower right) 226RL (not illustrated in FIG. 3) is installed below the display (upper right) 226RU on the right side surface portion inside the own vehicle, and displays a reproduction scroll bar for the image displayed on the display (upper right) 226RU. Note that the display (lower left) 226LL and the display (lower right) 226RL that display the reproduction scroll bar are touchscreen displays, detect a touch on the display by the passenger (operator), and transmit a detection signal to the control unit 211. Due to this, the control unit 211 can detect that the display (lower left) 226LL and the display (lower right) 226RL have been touched by the operator and which display area the operator has touched. Note that since the difference between the display (lower left) 226LL and the display (lower right) 226RL lies in whether to be installed on the left side or the right side of the vehicle, respectively, the display (lower left) 226LL installed on the left side will be explained below, and the explanation on the display (lower right) 226RL installed on the right side is sometimes omitted.

Next, a display example of the display (lower left) 226LL will be described with reference to FIGS. 5 to 7. FIG. 5 is a view showing a display example of the display (lower left) 226LL corresponding to an image being displayed on the display (upper left) 226LU shown in FIG. 4. FIG. 6 is a view showing a transition example of the display (lower left) 226LL during image reproduction control. FIG. 7 is a view showing a transition example of the display (lower left) 226LL while the image reproduction control is stopped.

As shown in FIG. 5, the display (lower left) 226LL displays the reproduction scroll bar 300, a reference line 301, a difference time indication 302, and a current location mark 303. The reproduction scroll bar 300 displays a thumbnail image group including a plurality of thumbnail images arranged side by side in order of shooting. At this time, a thumbnail image corresponding to the image being displayed on the display (upper left) 226LU is displayed distinguishably from other thumbnail images. Specifically, the thumbnail image corresponding to the image being displayed on the display (upper left) 226LU is displayed at a position superimposed on the reference line 301 arranged at the center of the reproduction scroll bar 300. That is, the thumbnail image displayed at the position superimposed on the reference line 301 is an image obtained by reducing the image being displayed on the display (upper left) 226LU. The difference time indication 302 indicates a difference time that is a difference between the shooting time of the image being displayed on the display (upper left) 226LU and the current time (time indicated by the system clock). The current location mark 303 is displayed immediately above a thumbnail image corresponding to an image shot at that time point (real time), and indicates that the image represents a view that can be seen from the current location. Furthermore, if the current location mark 303 is touched while an image shot in the past is being displayed on the display (upper left) 226LU, an image shot from the current location is displayed on the display (upper left) 226LU. Note that in a case where the display (upper left) 226LU is a display having the structure capable of transparent/non-transparent switching control described above, the display may be controlled to the transparent state to allow the passenger to see the live view.

The operator can perform the forward operation or the rewind operation of the image by laterally scrolling the reproduction scroll bar 300 (sliding right and left the reproduction scroll bar 300 in a state of touching the reproduction scroll bar 300 with a finger, a stylus, or the like). Specifically, the rewind operation can be performed by sliding rightward the reproduction scroll bar 300, and the forward operation can be performed by sliding leftward the reproduction scroll bar 300. The forward operation is an operation of switching an image displayed on the display (upper left) 226LU to an image shot after the image being displayed at the time point. In addition, the rewind operation is an operation of switching an image displayed on the display (upper left) 226LU to an image shot before the image being displayed at the time point. Note that in the present example, a scrolling operation involving a touch on the reproduction scroll bar 300 is defined as the forward operation or the rewind operation, but another operation involving no touch on the reproduction scroll bar 300 can be a forward operation or a rewind operation. For example, an operation of moving a hand, a foot, a head, a line of sight, or the like along the movement direction of the vehicle may be detected, an operation of moving from the front to rear may be detected as the forward operation, and an operation of moving from the rear to front may be detected as the rewind operation. In addition, for example, the control unit 211 may recognize, as a forward operation, an operation on a button A of a remote controller for operating the display control device 200, and may recognize, as a rewind operation, an operation on a button B of the remote controller.

The control unit 211 updates the reproduction scroll bar 300 in accordance with the switching of the image displayed on the display (upper left) 226LU. That is, in accordance with the switching of the image displayed on the display (upper left) 226LU, the control unit 211 slides leftward the thumbnail image group, and updates the reproduction scroll bar 300 so that the thumbnail image corresponding to the image being displayed on the display (upper left) 226LU is displayed at a position superimposed on the reference line 301. That is, the control unit 211 performs together image reproduction control and update of the reproduction scroll bar 300 such that the thumbnail image of the image being displayed on the display (upper left) 226LU is constantly superimposed on the reference line 301.

Furthermore, a stop operation and a resume operation can be performed by touching (long-pressing) the reproduction scroll bar 300 for longer than a predetermined time. The stop operation is an operation of stopping the reproduction control of the image displayed on the display (upper left) 226LU. Furthermore, the resume operation is an operation for resuming the stopped switching control. That is, when the reproduction scroll bar 300 is long-pressed during the image reproduction control, the control unit 211 detects this as a stop operation and stops the image reproduction control. Furthermore, when the reproduction scroll bar 300 is long-pressed while the image reproduction control is stopped, the control unit 211 detects this as a resume operation and resumes the image reproduction control that has been stopped.

Next, a transition example of the display (lower left) 226LL during image reproduction control will be described with reference to FIG. 6.

FIG. 6(A) is a display example of the display (lower left) 226LL when the shooting time of the image being displayed on the display (upper left) 226LU is 10:15:32 and the current time is 10:15:44. In this case, the difference time indication 302 indicates "12 seconds", which is a difference time between the shooting time and the current time.

FIG. 6(B) is a display example of the display (lower left) 226LL when the shooting time of the image being displayed on the display (upper left) 226LU is 10:15:33 and the current time is 10:15:45. In this case, the difference time indication 302 indicates "12 seconds", which is a difference time between the shooting time and the current time.

FIG. 6(C) is a display example of the display (lower left) 226LL when the shooting time of the image being displayed on the display (upper left) 226LU is 10:15:34 and the current time is 10:15:46. In this case, the difference time indication 302 indicates "12 seconds", which is a difference time between the shooting time and the current time.

That is, since the shooting is continuously performed with the lapse of time, and the image to be displayed on the display (upper left) 226LU is also switched with the lapse of time by the reproduction control, the difference time (12 seconds) does not change.

Next, a transition example of the display (lower left) 226LL while the reproduction control of the image to be displayed on the display (upper left) 226LU is stopped will be described with reference to FIG. 7.

FIG. 7(A) is a display example of the display (lower left) 226LL when the shooting time of the image being displayed on the display (upper left) 226LU is 10:15:32 and the current time is 10:15:32 (i.e., when an image shot at that time point is being displayed). In this case, the difference time indication 302 indicates "0 seconds", which is a difference time between the shooting time and the current time. Note that since there is no image following the image shot at the current time on the reproduction scroll bar 300, no image is displayed (e.g., blackened) on the right side of the image shot at the current time. Due to this, even if the difference time indication 302 and the current location mark 303 are not displayed, the passenger can recognize that, among the images displayed on the reproduction scroll bar 300, the image of which no image is displayed on the right side is the current image. The same is true for FIGS. 7B and 7C.

FIG. 7(B) is a display example of the display (lower left) 226LL when the shooting time of the image being displayed on the display (upper left) 226LU is 10:15:32 and the current time is 10:15:42. In this case, the difference time indication 302 indicates "10 seconds", which is a difference time between the shooting time and the current time. That is, the image shooting time increases from the time point shown in FIG. 7(A), whereas the image reproduction control is stopped, and hence the difference time increases. Note that the example of FIG. 7(B) indicates that 10 seconds have elapsed since the image reproduction control was stopped.

FIG. 7(C) is a display example of the display (lower left) 226LL when the shooting time of the image being displayed on the display (upper left) 226LU is 10:15:32 and the current time is 10:15:43. In this case, the difference time indication 302 indicates "11 seconds", which is a difference time between the shooting time and the current time. That is, the image shooting time increases from the time point shown in FIGS. 7(A) and (B), whereas the image reproduction control is stopped, and hence the difference time increases. Note that the example of FIG. 7(C) indicates that 11 seconds have elapsed since the image reproduction control was stopped.

FIG. 7(D) is a display example of the display (lower left) 226LL when the shooting time of the image being displayed on the display (upper left) 226LU is 10:15:32 and the current time is 10:15:44. In this case, the difference time indication 302 indicates "12 seconds", which is a difference time between the shooting time and the current time. That is, the image shooting time increases from the time point shown in FIGS. 7(A), (B), and (C), whereas the image reproduction control is stopped, and hence the difference time increases. Note that the example of FIG. 7(D) indicates that 12 seconds have elapsed since the image reproduction control was stopped.

That is, while the reproduction control of the image displayed on the display (upper left) 226LU is stopped, the shooting is continuously performed with the lapse of time, and on the other hand, the image is not switched with the lapse of time. Hence, the difference time increases with the lapse of time.

[1.2. Display Control Processing by Control Unit 211]

Next, the display control processing by the control unit 211 will be described with reference to the flowchart shown in FIG. 8. Note that FIG. 8 is a flowchart showing an example of the display control processing by the control unit 211. The display control processing is executed when a condition for displaying an image on the display 226 is satisfied. Note that the display control processing related to the display (upper left) 226LU and the display (lower left) 226LL will be described here.

First, the control unit 211 acquires the shooting time of the image (display start time image) displayed when the display of the image on the display (upper left) 226LU is started and the current time (step S101). The display start time image can be a discretionary image, and can be, for example, an image displayed when the display of the image is terminated last time, an image shot least recently, or the like. Furthermore, the current time is acquired from the system clock managed by the operating system.

Next, the control unit 211 calculates a difference time between the shooting time and the current time acquired in the processing of step S101, and stores the difference time in the storage unit 212 (step S102).

Next, the control unit 211 displays the reproduction scroll bar 300, the reference line 301, the difference time indication 302, and the current location mark 303 on the display (lower left) 226LL (step S103). Thumbnail images of the display start time image and images shot before and after the display start time image are selected as the thumbnail image group to be displayed on the reproduction scroll bar 300 so that the display start time image is displayed being superimposed on the reference line 301. The difference time indication 302 represents the difference time stored in the storage unit 212 in the processing of step S102.

Next, the control unit 211 displays the display start time image on the display (upper left) 226LU (step S104).

Next, the control unit 211 determines whether or not a stop flag is on (step S105). Note that the stop flag is stored in the storage unit 212, turned on in processing of step S114 described later, and turned off in processing of step S116 described later. If having determined that the stop flag is on (step S105: YES), the control unit 211 proceeds to the processing of step S108. On the other hand, if having determined that the stop flag is not on (the stop flag is off) (step S105: NO), the control unit 211 then switches the image displayed on the display (upper left) 226LU to the next image (step S106).

Next, the control unit 211 updates the reproduction scroll bar 300 of the display (lower left) 226LL in accordance with the image switching by the processing of step S106 or the processing of step S112 described later (step S107). That is, with the switching of the image displayed on the display (upper left) 226LU, the control unit 211 slides leftward the thumbnail image group, and displays the thumbnail image corresponding to the image being displayed on the display (upper left) 226LU at a position superimposed on the reference line 301.

Next, the control unit 211 acquires the shooting time of the image being displayed on the display (upper left) 226LU and the current time (step S108). Next, the control unit 211 calculates a difference time between the shooting time and the current time acquired in the processing of step S108, and updates the difference time stored in the storage unit 212 (step S109).

Next, the control unit 211 displays, in the difference time indication 302, the difference time updated in the processing of step S109 (step S110).

Next, the control unit 211 determines whether or not a rewind operation or a forward operation by the operator has been detected (step S111). If having determined that a rewind operation or a forward operation by the operator has been detected (step S111: YES), the control unit 211 switches the image to be displayed on the display (upper left) 226LU in accordance with the detected rewind operation or forward operation (step S112), and proceeds to the processing of step S107.

On the other hand, if having determined that the rewind operation or the forward operation by the operator has not been detected (step S111: NO), the control unit 211 then determines whether or not a stop operation has been detected (step S113). If having determined that a stop operation has not been detected (step S113: NO), the control unit 211 proceeds to the processing of step S115. On the other hand, if having determined that the stop operation has been detected (step S113: YES), the control unit 211 turns the stop flag on (step S114) and proceeds to the processing of step S115.

Note that when the stop flag is turned on, "YES" is determined in the processing of step S105, and the processing of step S106 (processing of switching the image to be displayed on the display (upper left) 226LU) and the processing of step S107 (processing of updating the reproduction scroll bar 300 to be displayed on the display (lower left) 226LL) are skipped. That is, the image reproduction control is stopped. Note that the processing from step S108 to step S110 are not skipped, and thus the update and display of the difference time are continued.

Next, the control unit 211 determines whether or not the stop operation flag is on and the resume operation has been detected (step S115). If having determined that the resume operation has not been detected (step S115: NO), the control unit 211 proceeds to the processing of step S117. On the other hand, if having determined that the resume operation has been detected (step S115: YES), the control unit 211 turns off the stop flag (step S116) and proceeds to the processing of step S117.

Next, the control unit 211 determines whether or not an image switching end condition has been satisfied (step S117). A discretionary condition can be set as the image switching end condition. For example, it is possible to set that an operation of ending the image reproduction control is detected, that the display control device 200 is turned off, or the like. If having determined that the image switching end condition has not been satisfied (step S117: NO), the control unit 211 proceeds to the processing of step S105 and repeats the processing of steps S105 to S117. On the other hand, if having determined that the image switching end condition has been satisfied (step S117: YES), the control unit 211 ends the display control processing.

2. Second Example

Figure 10:
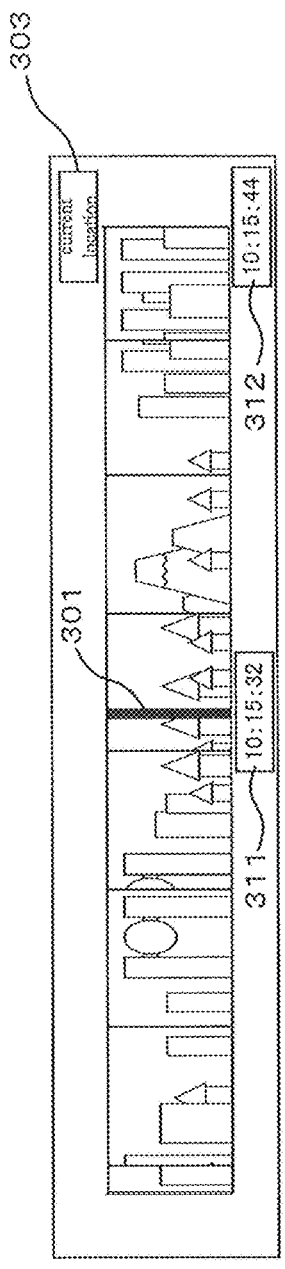
Figure 10:
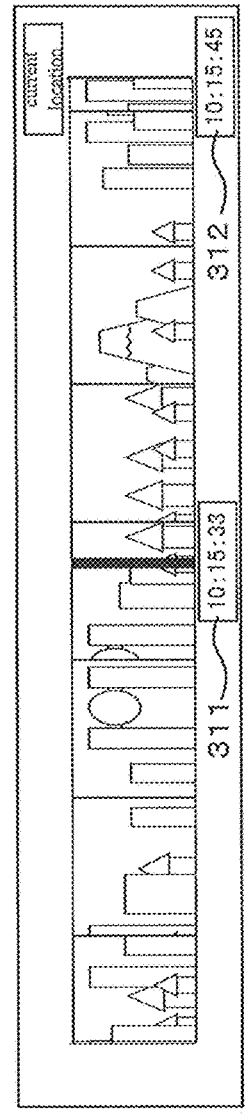
Figure 10:
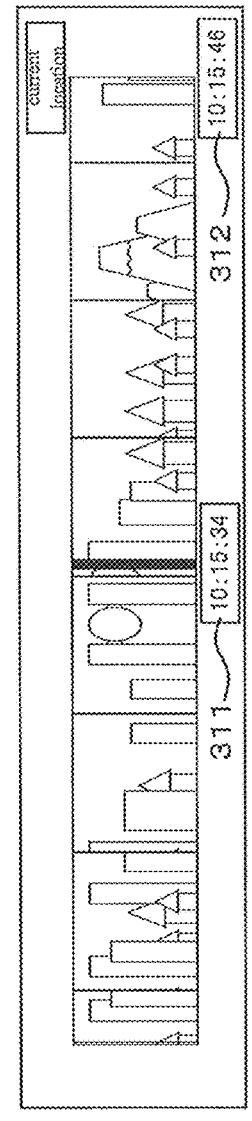
Figure 11:
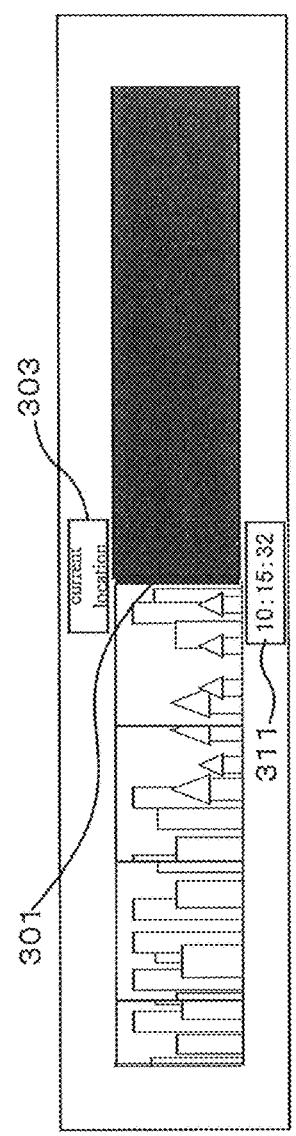
Figure 11:
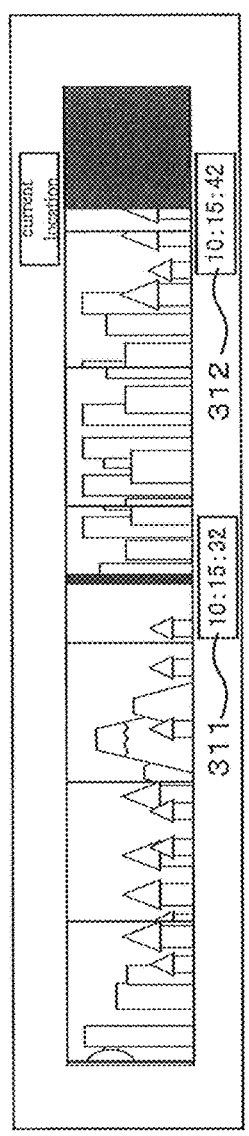
Figure 11:
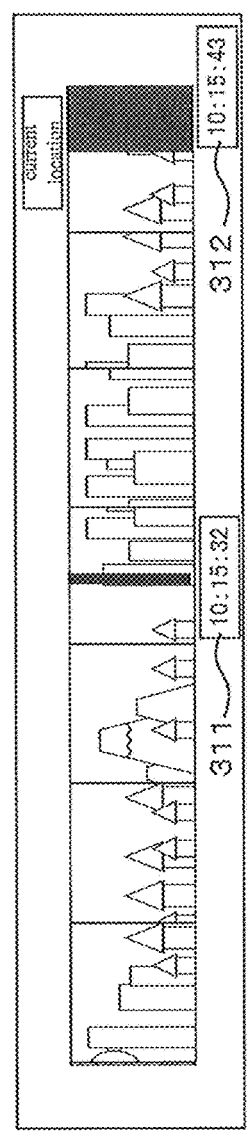
Figure 11:
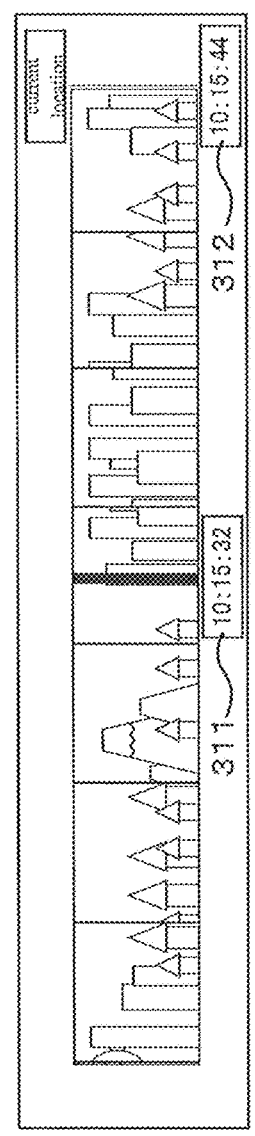

Next, the second example corresponding to the above-described embodiment will be described with reference to FIGS. 9 to 12. FIG. 9 is a view showing a display example of the display (lower left) 226LL in the second example. FIGS. 10 to 11 are views showing a transition example of the display (lower left) 226LL. FIG. 12 is a flowchart showing an example of the display control processing by the display control device 200 in the second example. Note that hereinafter, differences from the first example will be mainly explained, and the same members and processing as those of the first example will be explained using the same reference numerals.

In the first example, as shown in FIG. 5, the difference time between the shooting time and the current time is displayed on the display (lower left) 226LL as the difference time indication 302. However, in the second example, in place of this, the shooting time and the current time are displayed on the display (lower left) 226LL. Specifically, as shown in FIG. 9, the display (lower left) 226LL displays a shooting time indication 311 and a current time indication 312 in addition to the reproduction scroll bar 300, the reference line 301, and the current location mark 303. The shooting time indication 311 is arranged at a position corresponding to the reference line and represents the shooting time of the image being displayed on the display (upper left) 226LU. The current time indication 312 is arranged at a position corresponding to the thumbnail image corresponding to the image shot at that time point (real time) and represents the current time. The current location mark 303 is displayed immediately above a thumbnail image corresponding to an image shot at that time point (real time), and indicates that the image represents a view that can be seen from the current location. Furthermore, if the current location mark 303 is touched while an image shot in the past is being displayed on the display (upper left) 226LU, the control unit 211 displays, on the display (upper left) 226LU, an image shot from the current location. However, in a case where the display (upper left) 226LU is a display having the structure capable of transparent/non-transparent switching control described above, the display may be controlled to the transparent state to allow the passenger to see the live view.

A transition example of the display (lower left) 226LL during image reproduction control in the second example will be described with reference to FIG. 10.

FIG. 10(A) is a display example of the display (lower left) 226LL when the shooting time of the image being displayed on the display (upper left) 226LU is 10:15:32 and the current time is 10:15:44. The shooting time indication 311 and the current time indication 312 respectively represent them.

FIG. 10(B) is a display example of the display (lower left) 226LL when the shooting time of the image being displayed on the display (upper left) 226LU is 10:15:33 and the current time is 10:15:45. The shooting time indication 311 and the current time indication 312 respectively represent them.

FIG. 10(C) is a display example of the display (lower left) 226LL when the shooting time of the image being displayed on the display (upper left) 226LU is 10:15:34 and the current time is 10:15:46. The shooting time indication 311 and the current time indication 312 respectively represent them.

That is, since the shooting is continuously performed with the lapse of time, and the image to be displayed on the display (upper left) 226LU is also switched with the lapse of time by the reproduction control, the image shooting time and the current time go by. Note that, also in FIGS. 10(A) to (C), if the current location mark 303 is touched while an image shot in the past is being displayed on the display (upper left) 226LU, an image shot from the current location is displayed on the display (upper left) 226LU. However, in a case where the display (upper left) 226LU is a display having the structure capable of transparent/non-transparent switching control described above, the display may be controlled to the transparent state to allow the passenger to see the live view.

Next, a transition example of the display (lower left) 226LL while the reproduction control of the image to be displayed on the display (upper left) 226LU is stopped will be described with reference to FIG. 11.

FIG. 11(A) is a display example of the display (lower left) 226LL when the shooting time of the image being displayed on the display (upper left) 226LU is 10:15:32 and the current time is 10:15:32 (i.e., when an image shot at that time point is being displayed). The shooting time indication 311 and the current time indication 312 respectively indicate them.

FIG. 11(B) is a display example of the display (lower left) 226LL when the shooting time of the image being displayed on the display (upper left) 226LU is 10:15:32 and the current time is 10:15:42. The shooting time indication 311 and the current time indication 312 respectively indicate them.

FIG. 11(C) is a display example of the display (lower left) 226LL when the shooting time of the image being displayed on the display (upper left) 226LU is 10:15:32 and the current time is 10:15:43. The shooting time indication 311 and the current time indication 312 respectively indicate them.

FIG. 11(D) is a display example of the display (lower left) 226LL when the shooting time of the image being displayed on the display (upper left) 226LU is 10:15:32 and the current time is 10:15:44. The shooting time indication 311 and the current time indication 312 respectively indicate them.

That is, while the reproduction control of the image displayed on the display (upper left) 226LU is stopped, the shooting is continuously performed with the lapse of time, and on the other hand, the image is not switched with the lapse of time. Hence, the current time goes by but the shooting time does not go by. Note that, also in FIGS. 11(A) to (D), if the current location mark 303 is touched while an image shot in the past is being displayed on the display (upper left) 226LU, an image shot from the current location is displayed on the display (upper left) 226LU. However, in a case where the display (upper left) 226LU is a display having the structure capable of transparent/non-transparent switching control described above, the display may be controlled to the transparent state to allow the passenger to see the live view.

Next, the display control processing by the control unit 211 in the second example will be described with reference to the flowchart shown in FIG. 12. Note that FIG. 12 is a flowchart showing an example of the display control processing by the control unit 211 in the second example. The display control processing in the second example is executed when a condition for displaying an image on the display 226 is satisfied. Note that the display control processing related to the display (upper left) 226LU and the display (lower left) 226LL will be described here.

First, the control unit 211 acquires the shooting time of the image (display start time image) displayed when the display of the image on the display (upper left) 226LU is started and the current time, and stores them in the storage unit 212 (step S201). The display start time image can be a discretionary image, and can be, for example, an image displayed when the display of the image is terminated last time, an image shot least recently, or the like. Furthermore, the current time is acquired from the system clock managed by the operating system.

Next, the control unit 211 displays the reproduction scroll bar 300, the reference line 301, the current location mark 303, the shooting time indication 311, and the current time indication 312 on the display (lower left) 226LL (step S202). Thumbnail images of the display start time image and images shot before and after the display start time image are selected as the thumbnail image group to be displayed on the reproduction scroll bar 300 so that the display start time image is displayed being superimposed on the reference line 301. The shooting time indication 311 represents the shooting time stored in the storage unit 212 in the processing of step S201. The current time indication 312 represents the current time stored in the storage unit 212 in the processing of step S201.

Next, the control unit 211 displays the display start time image on the display (upper left) 226LU (step S203).

Next, the control unit 211 determines whether or not a stop flag is on (step S204). Note that the stop flag is stored in the storage unit 212, turned on in processing of step S214 described later, and turned off in processing of step S216 described later. If having determined that the stop flag is on (step S204: YES), the control unit 211 proceeds to the processing of step S209. On the other hand, if having determined that the stop flag is not on (the stop flag is off) (step S204: NO), the control unit 211 then switches the image on the display (upper left) 226LU to the next image (step S205).

Next, the control unit 211 updates the reproduction scroll bar 300 of the display (lower left) 226LL in accordance with the image switching by the processing of step S205 or the processing of step S212 described later (step S206). That is, with the switching of the image displayed on the display (upper left) 226LU, the control unit 211 slides leftward the thumbnail image group, and displays the thumbnail image corresponding to the image being displayed on the display (upper left) 226LU at a position superimposed on the reference line 301.

Next, the control unit 211 acquires the shooting time of the image being displayed on the display (upper left) 226LU, and updates the shooting time stored in the storage unit 212 (step S207). Next, the control unit 211 displays, in the shooting time indication 311, the shooting time updated in the processing of step S207 (step S208).

Next, the control unit 211 acquires the current time and updates the current time stored in the storage unit 212 (step S209). Next, the control unit 211 displays, in the current time indication 312, the current time updated in the processing of step S209 (step S210).

Next, the control unit 211 determines whether or not a rewind operation or a forward operation by the operator has been detected (step S211). If having determined that a rewind operation or a forward operation by the operator has been detected (step S211: YES), the control unit 211 switches the image to be displayed on the display (upper left) 226LU in accordance with the detected rewind operation or forward operation (step S212), and proceeds to the processing of step S206. Note that, when the forward operation is repeated to the limit, the control unit 211 displays, on the display (upper left) 226LU, an image shot from the current location. At this time, in a case where the display (upper left) 226LU is a display having the structure capable of transparent/non-transparent switching control described above, the display may be controlled to the transparent state to allow the passenger to see the live view. Furthermore, although not illustrated in the flowchart of FIG. 12, also when the operation on the current location button 303 is detected, the control unit 211 performs the same processing as that when the forward operation is repeated to the limit.

On the other hand, if having determined that the rewind operation or the forward operation by the operator has not been detected (step S211: NO), the control unit 211 then determines whether or not a stop operation has been detected (step S213). If having determined that a stop operation has not been detected (step S213: NO), the control unit 211 proceeds to the processing of step S215. On the other hand, if having determined that the stop operation has been detected (step S213: YES), the control unit 211 turns the stop flag on (step S214) and proceeds to the processing of step S215.

Note that when the stop flag is turned on, "YES" is determined in the processing of step S204, and the processing of step S205 (processing of switching the image to be displayed on the display (upper left) 226LU), the processing of step S206 (processing of updating the reproduction scroll bar to be displayed on the display (lower left) 226LL), the processing of step S207 (processing of acquiring and updating the shooting time of the image being displayed on the display (upper left) 226LU), and the processing of step S208 (processing of displaying the shooting time in the shooting time indication 311) are skipped. That is, the image reproduction control and the update of the shooting time are stopped. Note that the processing from step S209 and step S210 are not skipped, and thus the update and display of the current time are continued.

Next, the control unit 211 determines whether or not the stop operation flag is on and the resume operation has been detected (step S215). If having determined that the resume operation has not been detected (step S215: NO), the control unit 211 proceeds to the processing of step S217. On the other hand, if having determined that the resume operation has been detected (step S215: YES), the control unit 211 turns off the stop flag (step S216) and proceeds to the processing of step S217.

Next, the control unit 211 determines whether or not an image switching end condition has been satisfied (step S217). A discretionary condition can be set as the image switching end condition. For example, it is possible to set that an operation of ending the image reproduction control is detected, that the display control device 200 is turned off, or the like. If having determined that the image switching end condition has not been satisfied (step S217: NO), the control unit 211 proceeds to the processing of step S204 and repeats the processing of steps S204 to S217. On the other hand, if having determined that the image switching end condition has been satisfied (step S217: YES), the control unit 211 ends the display control processing.

As described above, the control unit 211 (example of "display control means") of the display control device 200 in the first example and the second example displays an image obtained by shooting the outside of the vehicle (example of "moving body") in the vehicle, and when displaying the image, displays, while updating with the lapse of time, how far back in the past from now the image being displayed was shot.

Therefore, according to the display control device 200 in the first example and the second example, when an image captured by shooting the outside of the vehicle is displayed in the vehicle, how far back in the past from now the image being displayed was shot is displayed while being updated with the lapse of time. Therefore, it is possible for the passenger to grasp when (how far back in the past) an image obtained by shooting the outside of a moving body and displayed in the moving body was shot.

In addition, the control unit 211 of the display control device 200 in the first example and the second example performs the image reproduction control (example of "switching control") of displaying a plurality of continuous images obtained by shooting the outside of the own vehicle while switching the images in order of shooting. Due to this, the passenger can enjoy in a pseudo manner the view during stopping or moving.

Furthermore, the control unit 211 of the display control device 200 in the first example displays, while updating, the difference time (example of "difference") between the shooting time at which the image being displayed on the display (upper left) 226LU was shot and the current time. Due to this, the passenger can grasp how far back in the past the image being displayed on the display (upper left) 226LU was shot.

Furthermore, the control unit 211 of the display control device 200 in the first example displays a plurality of thumbnail images side by side in order of shooting, displays, distinguishably from other thumbnail images using the reference line 301, the thumbnail image corresponding to the image being displayed on the display (upper left) 226LU among the thumbnail images displayed side by side, and displays, while updating, the difference time in correspondence with the distinguishably displayed thumbnail image. Due to this, the passenger can grasp how far back in the past the image being displayed on the display (upper left) 226LU was shot.

Furthermore, the control unit 211 (example of "detection means") of the display control device 200 in the first example detects a stop operation of stopping the image reproduction control, and when the stop operation is detected, stops the image reproduction control and continues the update of the difference time.

Moreover, the control unit 211 of the display control device 200 in the second example displays, while updating with the lapse of time, the shooting time at which the image being displayed on the display (upper left) 226LU was shot and the current time. Due to this, the passenger can grasp how far back in the past the image being displayed on the display (upper left) 226LU was shot.

Furthermore, the control unit 211 of the display control device 200 in the second example displays a plurality of thumbnail images side by side in order of shooting, displays, distinguishably from other thumbnail images using the reference line 301, the thumbnail image corresponding to the image being displayed on the display (upper left) 226LU among the thumbnail images displayed side by side, displays, while updating, the shooting time in correspondence with the distinguishably displayed thumbnail image, and displays, while updating, the current time in correspondence with the thumbnail image having the latest shooting time among the thumbnail images to be displayed side by side. Due to this, the passenger can grasp how far back in the past the image being displayed on the display (upper left) 226LU was shot.

Furthermore, the control unit 211 (example of "detection means") of the display control device 200 in the second example detects a stop operation of stopping the image reproduction control, and when the stop operation is detected, stops the image reproduction control and the update of the shooting time, and continues the update of the current time.

3. Third Example

Next, the third example will be described with reference to FIGS. 13 to 17. FIG. 13 is a block diagram showing a configuration example of the display control device 200A in the third example, and FIG. 14 is a schematic diagram showing an example of a vehicle (mainly inside thereof) equipped with the display control device 200A. FIGS. 15 to 17B) are views showing display examples of the display (left A) 226LA and the display (left A) 226LA in the third example. Note that hereinafter, differences from the first example will be mainly explained, and the same members and processing as those of the first example will be explained using the same reference numerals.

The display control device 200A includes the display (left A) 226LA, the display (left B) 226LB, a display (right A) 226RA, and a display (right B) 226RB. These displays are installed inside the own vehicle in the side surface direction with reference to the movement direction of the own vehicle (the forward direction and the backward direction, which is an opposite direction of the forward direction), and display an image generated by the camera 227. Specifically, as shown in FIG. 14, the display (left A) 226LA and the display (left B) 226LB are installed on the left side surface portion inside the own vehicle, and display an image generated by the camera (left) 227L. Similarly, the display (right A) 226RA (not illustrated in FIG. 14) and the display (right B) 226RB (not illustrated in FIG. 14) are installed on the right side surface portion inside the own vehicle, and display an image shot by the camera (right) 227R. Note that since the difference between the display (left A) 226LA and the display (left B) 226LB and the display (right A) 226RA and the display (right B) 226RB lies in whether to be installed on the left side or the right side of the vehicle, respectively, the display (left A) 226LA and the display (left B) 226LB installed on the left side will be explained below, and the explanation on the display (right A) 226RA and the display (right B) 226RB installed on the right side is sometimes omitted.

The control unit 211 performs an image reproduction control of displaying, on the display (left A) 226LA and the display (left B) 226LB, a plurality of continuous images generated by the camera (left) 227L while switching the images in order of shooting (shooting order). The control unit 211 displays, on the display (left A) 226LA and the display (left B) 226LB, an image shot in the past and an image shot at present (in real time) (may display, on the display (left A) 226LA and the display (left B) 226LB, images shot at different periods). At this time, the passenger sometimes fails to grasp whether the image displayed on the display (left A) 226LA or the display (left B) 226LB is an image shot in the past or an image shot at present. Therefore, as described below with reference to FIGS. 15 to 17, the control unit 211 displays the images so that the passenger can grasp whether the image displayed on the display (left A) 226LA or the display (left B) 226LB is an image shot in the past or an images shot at present.

First, as shown in FIG. 15(A), when performing reproduction control of an image shot in the past on the display (left A) 226LA, the control unit 211 may display a shooting period indication 316A (e.g., indicates as "past view") indicating that the image being displayed on the display (left A) 226LA is an image obtained by shooting a past view. Furthermore, when performing reproduction control of an image shot at present on the display (left B) 226LB, the control unit 211 may display a shooting period indication 316B (e.g., indicates as "present view") indicating that the image being displayed on the display (left B) 226LB is an image obtained by shooting a current view.

Furthermore, as shown in FIG. 15(B), when performing reproduction control of an image shot in the past on the display (left A) 226LA, the control unit 211 may display a shooting period indication 316C (e.g., indicates as "view of 10 seconds ago") indicating how far back in the past the view shot in the image being displayed on the display (left A) 226LA is. Furthermore, when performing reproduction control of an image shot at present on the display (left B) 226LB, the control unit 211 may display a shooting period indication 316D (indicates as "present view") indicating that the image being displayed on the display (left B) 226LB is an image obtained by shooting a current view.

Thus, by displaying the shooting period indications 316A, 316B, 316C, and 316D, the passenger can grasp whether the image being displayed on the display is a past image or a current image. In particular, by displaying the shooting period indication 316C, it is possible to grasp how far back in the past the images being displayed on the display was shot.

Furthermore, as shown in FIG. 16, when performing reproduction control of an image shot in the past on the display (left A) 226LA, the control unit 211 may display a shooting period mark 317A (e.g., circle mark) indicating that the image being displayed on the display (left A) 226LA is an image obtained by shooting a past view. Furthermore, when performing reproduction control of an image shot at present on the display (left B) 226LB, the control unit 211 may simultaneously display a shooting period mark 317B (e.g., double-circle mark) indicating that the image being displayed on the display (left B) 226LB is an image obtained by shooting a current view. Thus, by displaying the shooting period marks 317A and 317B, the passenger can grasp whether the image being displayed on the display is a past image or a current image. Note that the shooting period mark 317B (e.g., double-circle mark) may be displayed or hidden when the currently shot image is displayed, meanwhile how far back in the past from now the image was shot may be represented by the number of the shooting period marks 317A (e.g., circle mark) and the area of blackened shooting period marks (e.g., the closer to now, the smaller the number of shooting period marks, or the smaller the area of blackened shooting period marks) when the image shot in the past is displayed, and the number of the shooting period marks and the area of blackened shooting period marks may be changed with the lapse of time.

In FIG. 16, an image shot in the past and an image shot at present are distinguished by the shape of the shooting period mark. However, an image shot in the past and an image shot at present may be distinguished by the color of the shooting period mark. For example, a shooting period mark in red may be displayed when an image shot in the past is displayed, and a shooting period mark in green may be displayed when an image shot at present is displayed. Also in this case, by the color of the shooting period mark, the passenger can grasp whether the image being displayed on the display is a past image or a current image. Note that the shooting period mark in green may be displayed or hidden when the currently shot image is displayed, meanwhile how far back in the past from now the image was shot may be represented by the degree of shading or the transmittance of the shooting period mark in red (e.g., the closer to now, the darker the shooting period mark, or the lower the transmittance of the shooting period mark) when the image shot in the past is displayed, and the degree of shading of the shooting period mark and the transmittance of the shooting period mark may be changed with the lapse of time.

In addition, an image shot in the past and a currently shot image may be distinguished by displaying the shooting period mark when the image shot in the past is displayed, and not displaying the shooting period mark when the currently shot image is displayed (or vice versa).

Furthermore, an image shot in the past and a currently shot image may be distinguished by quickly switching the blinking of the shooting period mark when the image shot in the past is displayed, and slowly switching the blinking of the shooting period mark when the currently shot image is displayed (or vice versa). Note that the shooting period mark may be displayed or hidden when the currently shot image is displayed, meanwhile how far back in the past from now the image was shot may be represented by the switching speed of blinking of the shooting period mark (e.g., the closer to now, the shorter the switching speed) when the image shot in the past is displayed, and the speed may be changed with the lapse of time.

Moreover, an image shot in the past and a currently shot image may be distinguished by displaying the shooting period mark that is large in size when the image shot in the past is displayed, and displaying the shooting period mark that is smaller than that when the currently shot image is displayed (or vice versa). Note that the shooting period mark may be displayed small or hidden when the currently shot image is displayed, meanwhile how far back in the past from now the image was shot may be represented by the size of the shooting period mark (e.g., the closer to now, the smaller the shooting period mark (however, larger than the shooting period mark displayed together with the currently shot image)) when the image shot in the past is displayed, and the size may be changed with the lapse of time.

Note that, as in the example described here, an image currently being shot and the image shot in the past are displayed, the shooting period mark corresponding to each of the images and indicating the shooting period of each of the images is displayed, and the display format of the shooting period mark corresponding to the image currently being shot and the shooting period mark corresponding to the image shot in the past are made different, whereby the passenger can grasp whether the image being displayed is a past image or a current image. Furthermore, how far back in the past from now the image was shot may be represented by the difference in the display format of the shooting period mark when the shooting period mark corresponding to the image shot in the past is displayed, and the difference in the display format may be changed with the lapse of time.

Moreover, as shown in FIG. 17(A), when performing reproduction control of an image shot in the past on the display (left A) 226LA and the display (left B) 226LB, the control unit 211 may perform reproduction control of a currently shot image in the current image display window 318 of each display. In addition, as shown in FIG. 17(B), also when performing reproduction control of an image shot in the past on the display (left A) 226LA and performing reproduction control of a currently shot image on the display (left B) 226LB, the control unit 211 may perform reproduction control of the currently shot image in the current image display window 318 of each display. Due to this, by comparing the currently shot image displayed on the current image display window 318 with the image displayed on each display, the passenger can grasp whether the image being displayed on each of the displays is a past image or a current image. Note that the current image display window 318 may not be displayed when reproduction control of a currently shot image is performed on the display. Due to this, when the reproduction control of a currently shot image is performed on the display, even without comparing the image being displayed on the display with the image being displayed in the current image display window 318, the passenger can recognize that the image being displayed on the display is the currently shot image due to the fact that the current image display window 318 is not displayed.

4. Variations

Next, variations of the present example will be described. Note that the variations described below can be appropriately combined.

[4.1. Variation 1]

In the first example, the difference time between the shooting time of the image being displayed on the display (upper left) 226LU and the current time is indicated in the difference time indication 302 of the display (lower left) 226LL. However, in place of this or in addition to this, the difference time may be displayed in any area of the display (upper left) 226LU. For example, the difference time indication 321 indicating the difference time may be displayed being superimposed on an image displayed by the display (upper left) 226LU as shown in FIG. 18. According to the variation, the passenger can grasp the difference time between the shooting time and the current time while viewing the image displayed on the display (upper left) 226LU.

[4.2. Variation 2]

In the second example, the shooting time of the image being displayed on the display (upper left) 226LU and the current time are indicated in the shooting time indication 311 and the current time indication 312 of the display (lower left) 226LL. However, in place of this or in addition to this, the shooting time and the current time may be displayed in any area of the display (upper left) 226LU. For example, a shooting time and current time indication 322 indicating the shooting time and the current time may be displayed being superimposed on an image displayed by the display (upper left) 226LU as shown in FIG. 19. According to the variation, the passenger can grasp the shooting time and the current time while viewing the image displayed on the display (upper left) 226LU.

[4.3. Variation 3]

As shown in FIG. 20, the control unit 211 may display, while updating with the lapse of time, on a part of the display (upper left) 226LU or display (lower left) 226LL, a map 400 including a shooting point mark 401 indicating a shooting point at which the image being displayed on the display (upper left) 226LU was shot. In the case of this variation, the control unit 211 stores the image shot by the camera 227 so as to be able to specify the point at which the image was shot. For example, the image itself may hold the shooting point as attribute information, or may be managed by a table or the like that associates the image with the shooting point.

According to the variation, with the image reproduction control, the position of the shooting point mark 401 on the map 400 changes with the lapse of time. Based on the map, the passenger can grasp how far back in the past the passenger passed through the point where the image displayed by the display (upper left) 226LU was shot.

Furthermore, as shown in FIG. 21, the control unit 211 may display, while updating with the lapse of time, the map 400 further including a current location mark 402 indicating the current location of the own vehicle. In this case, the positions of the shooting point mark 401 and the current location mark 402 on the map 400 change with the lapse of time. From the distance between the current location and the shooting point displayed on the map, the passenger can grasp how far back in the past the passenger passed through the point where the image being displayed by the display (upper left) 226LU was shot.

Note that the display that displays the map 400 is not limited to the display (upper left) 226LU or the display (lower left) 226LL, and the map 400 may be displayed on another display. For example, the map 400 may be displayed on another display installed in the vehicle or a display of a mobile terminal carried by the passenger.

[4.4. Variation 4]

When displaying an image on the display (upper left) 226LU, the control unit 211 may display the image while updating the color tone of the image in accordance with the difference time between the shooting time of the image and the current time. For example, a color tone conversion table for converting the color tone of the image in accordance with the difference time is stored in the storage unit 212, and the control unit 211 changes the color tone of the image to be displayed on the display (upper left) 226LU based on the difference time and the color tone conversion table. For example, the longer the difference time is, the stronger the sepia tone may become, or the lighter the color tone may become. According to the variation, the passenger can grasp how far back in the past the image was shot from the color tone of the image being displayed. In addition, since the difference time increases while the image reproduction control is stopped, the color tone of the image whose display is stopped changes to a sepia tone or the color tone changes to a lighter tone, whereby the passenger's interest can be improved.

In addition, the control unit 211 may also change the color tone of the thumbnail image displayed on the display (lower left) 226LL similarly in accordance with the difference time between the shooting time of the original image of the thumbnail image and the current time.

[4.5. Variation 5]

In the first example and the second example, an image shot by the camera 227 installed in the own vehicle is displayed on the display 226 installed in the own vehicle. However, a view shot by a camera other than the camera 227 installed in the own vehicle from a route on which the own vehicle moves may be displayed on the display 226. For example, an image shot by a camera (camera that may be installed in another vehicle or owned by a passenger of another vehicle) other than the camera 227 may be stored in a server (not illustrated) in association with a shooting point, a shooting orientation (whether to be the left side or the right side along the route), and a shooting date and time, and the display control device 200 may receive the image from the server based on the movement route of the own vehicle and display the image on the display 226.

[4.6. Variation 6]

In the first example and the second example, an image is displayed on the display 226 installed on the side surface portion of the own vehicle. In place of this, however, a projector may be installed to display an image and the reproduction scroll bar display area on the side surface portion of the own vehicle. In this case, since an operation by touching the display 226 cannot be detected, for example, an operation of moving a hand, a foot, a head, a line of sight, or the like along the movement direction of the vehicle may be detected by a camera, an optical sensor, or the like installed in the vehicle, and when the movement direction of the vehicle is the forward direction, an operation of moving from the front to rear may be detected as the forward operation, and an operation of moving from the rear to front may be detected as the rewind operation. In addition, for example, the control unit 211 may recognize, as a forward operation, an operation on a button A of a remote controller for operating the display control device 200, and may recognize, as a rewind operation, an operation on a button B of the remote controller.

[4.7. Variation 7]

The first example and the second example assume that shooting is continued by the camera (left) 227L also when an image is displayed on the display (upper left) 226LU. However, an image that is not being shot at that time point may be displayed on the display (upper left) 226LU. For example, after the camera (left) 227L performs shooting in a moving image format from 10:15:00 to 11:15:00, an image generated by the shooting having shooting time of 10:55:00 may be displayed on the display (upper left) 226LU when the current time is 12:00:00. In this case, the control unit 211 may display the current time as "12:00:00" and the shooting time as "10:55:00", or may display "65:00", which is the difference time between them.

EXPLANATION OF REFERENCE NUMERALS 100 display control device
101 display control means
200 display control device
211 control unit
211a CPU
211b ROM
211c RAM
212 storage unit
213 input unit
214 display unit
214a graphics controller
214b buffer memory
215 communication unit
220 input/output interface unit
221 vehicle speed sensor
222 angular velocity sensor
223 acceleration sensor
224 steering angle sensor
225 global navigation satellite system (GNSS) reception unit
226 display
227 camera

The invention claimed is:

1. A display control device, comprising:
a display controller that displays an image in a moving body, wherein the image is obtained by shooting an outside of the moving body,
wherein, when displaying the image, the display controller displays, while updating with a lapse of time, how far back in a past from now the image being displayed was shot,
wherein the display controller displays a difference time between a shooting time at which the image being displayed was shot and a current time while performing the update, and
wherein the display controller performs a switching control of displaying a plurality of the images obtained by shooting the outside of the moving body while switching the images in order of shooting; and
a controller that detects a stop operation of stopping the switching control,
wherein, when the stop operation is detected, the display controller stops the switching control, and continues the update of the difference time.

2. The display control device according to claim 1,
wherein the controller acquires the current time,
wherein the controller acquires the shooting time at which the image being displayed was shot, and
wherein the controller calculates the difference time between the shooting time and the current time.

3. The display control device according to claim 2, wherein the display controller further displays a plurality of the images side by side in order of shooting, displays, distinguishably from other images, an image corresponding to the image being displayed among the images to be displayed side by side, and displays, while performing the update, the difference time corresponding to the distinguishably displayed image.

4. The display control device according to claim 2, wherein the display controller displays, while updating with a lapse of time, a map including a shooting point at which the image being displayed was shot and a current location of the moving body.

5. The display control device according to claim 2, wherein, when displaying the image, the display controller displays the image while updating a color tone of the image in accordance with the difference time between the shooting time of the image and the current time.

6. The display control device according to claim 2, wherein, when displaying an image shot in a past, the display controller displays a mark indicating how far back in a past from now the image was shot, and displays the mark while updating a display format with a lapse of time.

7. A display control device, comprising:
a display controller that displays an image in a moving body, wherein the image is obtained by shooting an outside of the moving body,
wherein, when displaying the image, the display controller displays, while updating with a lapse of time, how far back in a past from now the image being displayed was shot,
wherein the display controller displays a difference time between a shooting time at which the image being displayed was shot and a current time while performing the update,
wherein the display controller displays, while updating with a lapse of time, a shooting time at which the image being displayed was shot and a current time; and
a controller that detects a stop operation of stopping a switching control of displaying a plurality of the images obtained by shooting the outside of the moving body while switching the images in order of shooting, wherein, when the stop operation is detected, the display controller stops the switching control and the update of the shooting time, and continues the update of the current time.

8. The display control device according to claim 7, wherein the controller acquires the current time,
wherein the controller acquires the shooting time at which the image being displayed was shot, and
wherein the controller calculates the difference time between the shooting time and the current time.

9. The display control device according to claim 8, wherein the display controller further displays a plurality of the images side by side in order of shooting, displays, distinguishably from other images, an image corresponding to the image being displayed among the images displayed side by side, displays, while performing the update, the shooting time corresponding to the distinguishably displayed image, and displays, while performing the update, the current time corresponding to a latest image among the images to be displayed side by side.

10. A display control method by a display control device, the display control method comprising:
 displaying, by a display controller, an image in a moving body, wherein the image is obtained by shooting an outside of the moving body;
 displaying, while updating with a lapse of time, how far back in past from now the image being displayed was shot, when displaying the image by the displaying the image,
  wherein, in the displaying the image, a difference time between a shooting time at which the image being displayed was shot and a current time while performing the update is displayed;
 performing a switching control of displaying a plurality of the images obtained by shooting the outside of the moving body while switching the images in order of shooting; and
 detecting, by a controller, a stop operation of stopping the switching control,
 wherein, when the stop operation is detected, the display controller stops the switching control, and continues the update of the difference time.

11. The display control method according to claim 10, further comprising:
 acquiring, by the controller, the current time, wherein the controller acquires the shooting time at which the image being displayed was shot,
 wherein the controller calculates the difference time between the shooting time and the current time.

\* \* \* \* \*